US007756694B2

(12) United States Patent
Graf et al.

(10) Patent No.: US 7,756,694 B2
(45) Date of Patent: Jul. 13, 2010

(54) METHOD FOR INTERACTIVE AUTOMATION OF FAULT MODELING INCLUDING A METHOD FOR INTELLIGENTLY SENSING FAULT-FAULT RELATIONSHIPS

(75) Inventors: Kermit Graf, Austin, TX (US); David Mack Endres, Leander, TX (US); Mark Hall, Oslo (NO); James C. Pickens, Wassenaar (NL)

(73) Assignees: Schlumberger Technology Corporation, Houston, TX (US); ExxonMobil Upstream Research Company, Houston, TX (US)

( * ) Notice: Subject to any disclaimer, the term of this patent is extended or adjusted under 35 U.S.C. 154(b) by 578 days.

(21) Appl. No.: 11/755,572

(22) Filed: May 30, 2007

(65) Prior Publication Data

US 2008/0010047 A1    Jan. 10, 2008

Related U.S. Application Data

(60) Provisional application No. 60/809,471, filed on May 31, 2006.

(51) Int. Cl.
G06G 7/58 (2006.01)
G01V 3/18 (2006.01)
(52) U.S. Cl. .................. 703/10; 702/6; 702/11
(58) Field of Classification Search ............ 703/10, 703/2; 702/6–15
See application file for complete search history.

(56) References Cited

U.S. PATENT DOCUMENTS

| 5,453,958 | A | * | 9/1995 | Neff | 367/70 |
| 5,982,707 | A | | 11/1999 | Abbott | |
| 6,014,343 | A | | 1/2000 | Graf et al. | |
| 6,138,076 | A | | 10/2000 | Graf et al. | |

OTHER PUBLICATIONS

R.C. Belcher, "Geospatial Modeling Techniques for Understanding Internal Geometries of Complexly Faulted Reservoirs" Society of Petroleum Engineers, SPE 27543, 1994 pp. 39-49.*
Karen S. Hoffman, John W. Neave, "Horizon Modeling Using a Three-Dimensional Fault Restoration Technique" Society of Petroleum Engineers, SPE 56445, 1999, pp. 1-8.*
Martyn B. Beardsell, Heather Buscher, "Streamlining Interpretation Workflow" Oilfield Review, 1998, pp. 22-39.*
Rutger Gras, "Automated 3-D Software Interprets Fault Systems", Geophysical/Geological Report, World Oil, May 1998 (2 pages).
International Search Report dated Dec. 5, 2007 (3 pages).

* cited by examiner

*Primary Examiner*—Dwin M Craig
(74) *Attorney, Agent, or Firm*—John Bouchard; Osha Liang LLP

(57) ABSTRACT

A method is disclosed for sensing fault-fault relationships, comprising: automatically sensing interrelationships among faults, and presenting a final model including a fault-fault intersection curve and one fault truncated at the curve to an interpreter representing the interrelationships among faults.

62 Claims, 16 Drawing Sheets

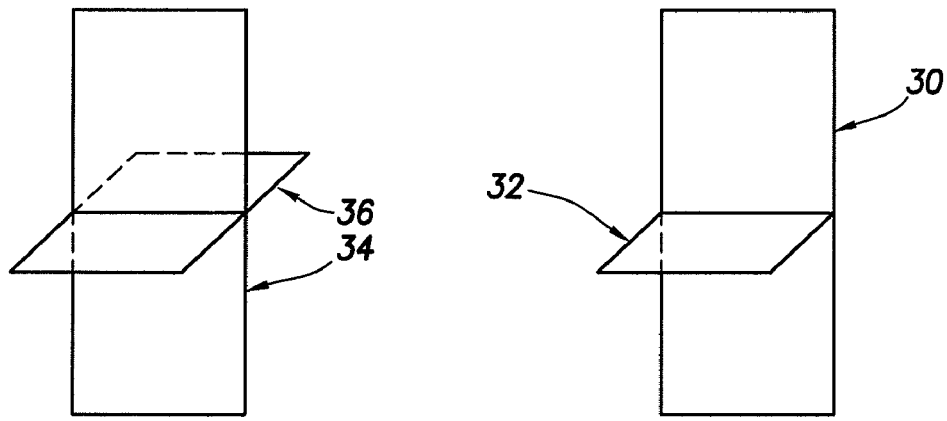
FIG. 11
(Prior Art)
FIG. 12
(Prior Art)
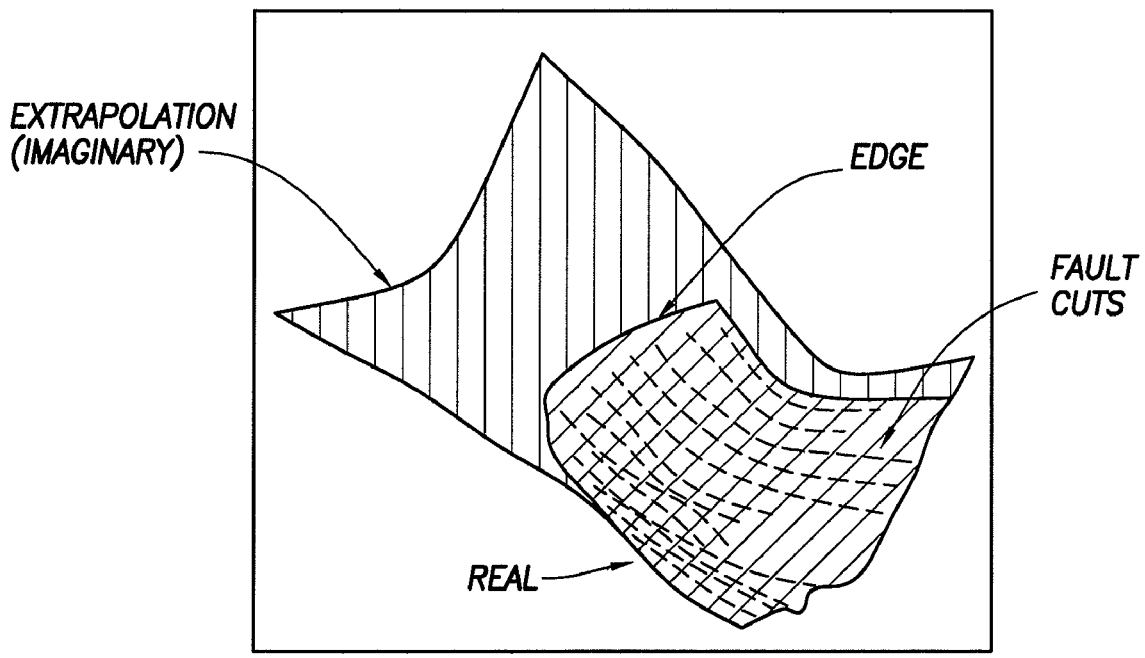
FIG. 13
(Prior Art)

METHOD FOR INTERACTIVE AUTOMATION OF FAULT MODELING INCLUDING A METHOD FOR INTELLIGENTLY SENSING FAULT-FAULT RELATIONSHIPS

CROSS REFERENCE TO RELATED APPLICATIONS

This is a Utility application of prior pending Provisional application Ser. No. 60/809,471 filed May 31, 2006 entitled "Method for Interactive Automation of Fault Modeling Including a Method for Intellisensing Fault-Fault Relationships".

BACKGROUND

The subject matter disclosed in this specification relates to a method, and a corresponding system and program storage device and computer program, for interactive automation of fault modeling, and, in particular, to a method for intelligently sensing fault-fault relationships as part of a fault interpretation process.

When computers are a preferred way of characterizing oil and gas reservoirs for the purpose of drilling wellbores, or making other decisions needed for exploitation, 'interactive automation of fault modeling' simplifies a traditionally awkward process of generating fault frameworks. The reservoir structure (i.e., horizons, faults, geobodies) is central to reservoir modeling. This specification discloses a method for 'interactive automation of fault modeling' pertaining to enhancements or improvements in the way fault structures in a formation are modeled as an embedded part of fault interpretation.

The following U.S. patents are incorporated herein by reference: (1) U.S. Pat. No. 5,982,707 to Abbott, entitled "Method and Apparatus for Determining Geologic Relationships for Intersecting Faults", and (2) U.S. Pat. No. 6,014,343 to Graf et al, entitled "Automatic Non-Artifically Extended Fault Surface Based Horizon Modeling System".

SUMMARY OF THE INVENTION

One aspect of the present invention involves a method for interactive automation of fault modeling, comprising: sensing a fault-fault relationship between a pair of faults; and displaying a final model which includes the pair of faults, the final model illustrating the pair of faults as being interconnected.

A further aspect of the present invention involves a program storage device readable by a machine tangibly embodying a program of instructions executable by the machine to perform method steps for interactive automation of fault modeling, the method steps comprising: sensing a fault-fault relationship between a pair of faults; and displaying a final model which includes the pair of faults, the final model illustrating the pair of faults as being interconnected.

A further aspect of the present invention involves a computer program adapted to be executed by a processor, the computer program, when executed by the processor, conducting a process for interactive automation of fault modeling, the process comprising: sensing a fault-fault relationship between a pair of faults; and displaying a final model which includes the pair of faults, the final model illustrating the pair of faults as being interconnected.

A further aspect of the present invention involves a method for intelligently sensing fault-fault relationships as part of a fault interpretation process, the method comprising: computing models of one or more faults as if each fault were unrelated to any other fault; detecting a condition wherein data associated with one fault being interpreted indicates that the fault is close to one or more other faults, the one fault and the one or more other faults being potentially related faults; presenting the one or more potentially related faults to an interpreter, the interpreter confirming or denying that a connection relationship exists between the potentially related faults; and computing a connection relationship between the potentially related faults thereby generating a final model on the condition that the interpreter confirms that the connection relationship exists between the potentially related faults.

A further aspect of the present invention involves a program storage device readable by a machine tangibly embodying a program of instructions executable by the machine to perform method steps for intelligently sensing fault-fault relationships as part of a fault interpretation process, the method steps comprising: computing models of one or more faults as if each fault were unrelated to any other fault; detecting a condition wherein data associated with one fault being interpreted indicates that the fault is close to one or more other faults, the one fault and the one or more other faults being potentially related faults; presenting the one or more potentially related faults to an interpreter, the interpreter confirming or denying that a connection relationship exists between the potentially related faults; and computing a connection relationship between the potentially related faults thereby generating a final model on the condition that the interpreter confirms that the connection relationship exists between the potentially related faults.

A further aspect of the present invention involves a computer program adapted to be executed by a processor, the computer program, when executed by the processor, conducting a method for intelligently sensing fault-fault relationships as part of a fault interpretation process, the method comprising: computing models of one or more faults as if each fault were unrelated to any other fault; detecting a condition wherein data associated with one fault being interpreted indicates that the fault is close to one or more other faults, the one fault and the one or more other faults being potentially related faults; presenting the one or more potentially related faults to an interpreter, the interpreter confirming or denying that a connection relationship exists between the potentially related faults; and computing a connection relationship between the potentially related faults thereby generating a final model on the condition that the interpreter confirms that the connection relationship exists between the potentially related faults.

A further aspect of the present invention involves a system adapted for intelligently sensing fault-fault relationships as part of a fault interpretation process, the system comprising: first apparatus adapted for computing models of one or more faults as if each fault were unrelated to any other fault; second apparatus adapted for detecting a condition wherein data associated with one fault being interpreted indicates that the fault is close to one or more other faults, the one fault and the one or more other faults being potentially related faults; third apparatus adapted for presenting the one or more potentially related faults to an interpreter, the interpreter confirming or denying that a connection relationship exists between the potentially related faults; and fourth apparatus adapted for computing a connection relationship between the potentially related faults thereby generating a final model on the condition that the interpreter confirms that the connection relationship exists between the potentially related faults.

A further aspect of the present invention involves a system adapted for interactive automation of fault modeling, comprising: first apparatus adapted for sensing a fault-fault relationship between a pair of faults; and second apparatus adapted for displaying a final model which includes the pair of faults, the final model illustrating the pair of faults as being interconnected.

A further aspect of the present invention involves a method for sensing fault-fault relationships, comprising: automatically sensing interrelationships among faults, and presenting a final model including the fault-fault intersection curve and one fault truncated at the curve to an interpreter representing the interrelationships among faults.

A further aspect of the present invention involves a computer program adapted to be executed by a processor, the computer program, when executed by the processor, conducting a process for sensing fault-fault relationships, the process comprising: automatically sensing interrelationships among faults, and presenting a final model including the fault-fault intersection curve and one fault truncated at the curve to an interpreter representing the interrelationships among faults.

A further aspect of the present invention involves a program storage device readable by a machine tangibly embodying a set of instructions executable by the machine to perform method steps for sensing fault-fault relationships, the method steps comprising: automatically sensing interrelationships among faults, and presenting a final model including the fault-fault intersection curve and one fault truncated at the curve to an interpreter representing the interrelationships among faults.

A further aspect of the present invention involves a system adapted for sensing fault-fault relationships, comprising: apparatus adapted for automatically sensing interrelationships among faults, and apparatus adapted for presenting a final model including a fault-fault intersection curve and one fault truncated at the curve to an interpreter representing the interrelationships among faults.

Further scope of applicability will become apparent from the detailed description presented hereinafter. It should be understood, however, that the detailed description and the specific examples set forth below are given by way of illustration only, since various changes and modifications within the spirit and scope of the 'Fault Modeling Software', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIGS. 9 and 11 through 13 represent various illustrations of fault relationships, applied or not applied;

DETAILED DESCRIPTION

This specification discloses a concept known as 'interactive automation of fault modeling' which is a process that is performed as part of 'fault interpretation' in connection with oil and/or gas exploration and production. The 'interactive automation of fault modeling' simplifies a traditionally awkward process of generating fault frameworks. During interpretation, background modeling processes are employed which present 'auto-sensed relationships among faults'. These background processes, (discussed again later in this specification) autogenerate fault surfaces during interpretation and detect their relative proximity. An example of 'auto-sensed relationships among faults' would be: How one fault should truncate another fault. The interpreter confirms these relationships, continues with the interpretation process, and a 'framework of interconnected fault models' are made available which represents an 'added value' to the fault interpretation process.

The 'interactive automation of fault modeling' process, and, in particular, the 'auto-sensed relationship among faults' process, are useful when computers represent the preferred way for characterizing oil and gas reservoirs and for drilling wellbores, and for other decisions which need to be made in connection with the exploitation of a reservoir during oil and/or gas exploration and production. The 'reservoir structure', as defined by the assembly of horizons, faults, and geobodies, serves as the foundation for 'reservoir modeling'. As a result, this specification discloses further improvements and enhancements in the method by which fault frameworks are modeled as an embedded part of the fault interpretation process.

Consequently, in this specification, an 'interconnected network of faults' is modeled, as part of the fault interpretation workflow process, by: (1) automatically sensing 'interrelationships among faults'; for example, one 'interrelationship among faults' would be: how one fault should truncate against another fault, and (2) presenting, to a user/operator, the 'interrelationships among faults' as an inseparable part of the interpretation process. This 'interactive automation of fault modeling' is considered an interactive and dynamic process, given that it compliments the iterative nature of fault interpretation. The functionality is designed to be minimally intrusive to the interpreter. In turn, the interpreter is allowed to focus on the subsurface geology rather than the model building process. However, in any event, as a result of the 'interactive automation of fault modeling' process, a 'model' is produced which represents an 'added value' to the fault interpretation process.

The 'interactive automation of fault modeling' process, described in this specification, actually represents a "method for intelligently sensing (i.e., 'intellisensing') fault-fault relationships" that is performed at interactive response speeds.

Figures 2, 3:
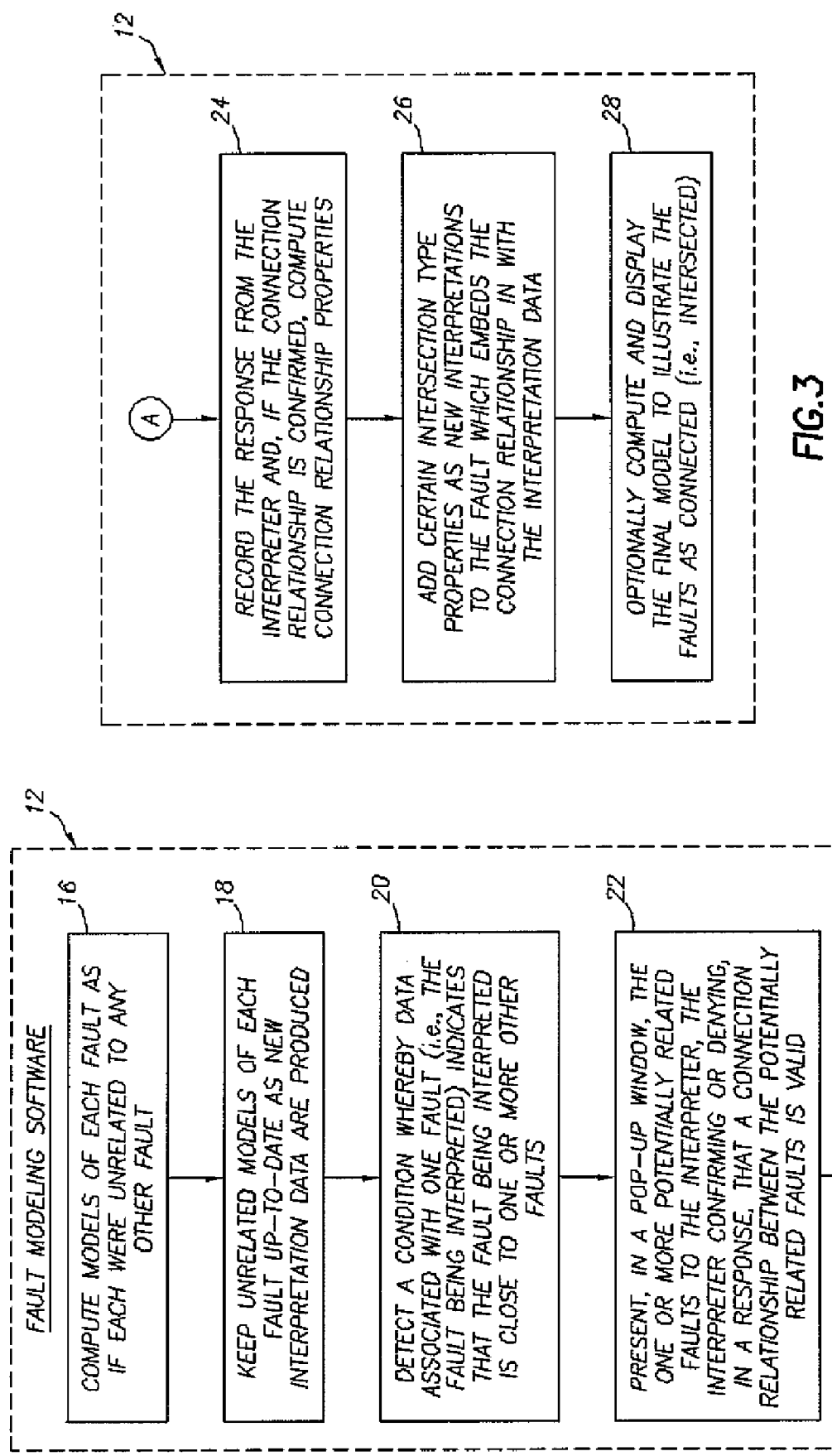
FIGS. 2 and 3 illustrate a block diagram describing a first embodiment (A) of the function practiced by the Fault Modeling Software of FIG. 1.

The aforementioned 'interactive automation of fault modeling' process, which performs and practices a 'method for intelligently sensing (i.e., intellisensing) fault-fault relationships', is accomplished, in accordance with a first embodiment (as indicated by FIGS. 2 and 3), by: (a) computing models of each fault as if each were unrelated to any other fault, (b) keeping (unrelated) models up-to-date as new interpretation data are produced, (c) detecting a condition whereby data of one fault (the one being interpreted) is 'close to' one or more other faults (see FIG. 15 for a detailed construction of 'Fault Proximity Detection' wherein the one fault is determined to be 'close to' the one or more other faults), (d) presenting in a pop-up window, or flashing on the display of the 'fault-fault intersection curve', the 'one or more potentially related faults' to the interpreter so that the interpreter can then confirm or deny that a connection relationship is valid, (e) recording a response from the interpreter and, if a relationship is confirmed by the interpreter, compute connection relationship properties, (f) adding certain intersection-type properties as new interpretations to the fault, which embeds the relationship in with interpretation data, (g) optionally computing and displaying the related model to illustrate the faults as connected (i.e., intersected).

Examples of fault and horizon modeling can be found in: (1) U.S. Pat. No. 6,014,343 to Graf et al, (2) U.S. Pat. No. 6,138,076 to Graf et al, and (3) U.S. Pat. No. 5,982,707 to Abbott, the disclosures of which are incorporated by reference into the specification of this application.

Figure 1:
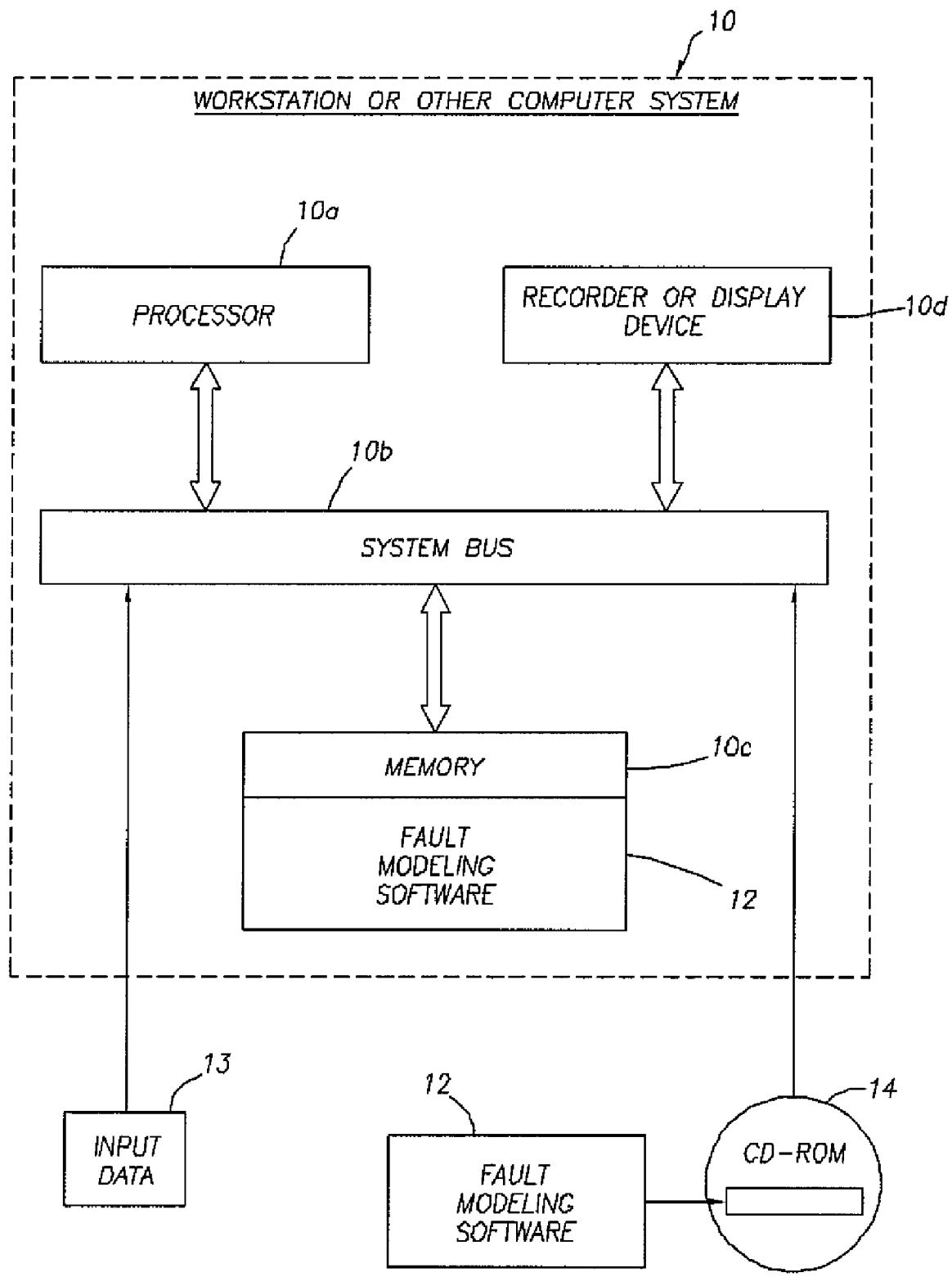
FIG. 1 illustrates a workstation or other computer system which stores a software package known as the 'Fault Modeling Software'.

Referring to FIG. 1, a workstation or other computer system is illustrated which stores a 'Fault Modeling Software' that performs or practices the aforementioned 'interactive automation of fault modeling' process, where the 'interactive automation of fault modeling' process performs and practices a 'Method for Intelligently Sensing (i.e., intellisensing) Fault-Fault relationships'.

In FIG. 1, a workstation, personal computer, or other computer system 10 is illustrated adapted for storing a 'Fault Modeling Software'. The computer system 10 of FIG. 1 includes a Processor 10a operatively connected to a system bus 10b, a memory or other program storage device 10c operatively connected to the system bus 10b, and a recorder or display device 10d operatively connected to the system bus 10b. The memory or other program storage device 10c stores the 'Fault Modeling Software' 12 that practices the 'interactive automation of fault modeling' process, where the 'interactive automation of fault modeling' process performs and practices a 'Method for Intelligently Sensing (i.e., intellisensing) Fault-Fault relationships'.

The 'Fault Modeling Software' 12, which is stored in the memory 10c of the computer system 10 of FIG. 1, can be initially stored on a CD-ROM 14, where that CD-ROM 14 is also a 'program storage device'. That CD-ROM 14 can be inserted into the computer system 10, and the 'Fault Modeling Software' 12 can be loaded from that CD-ROM 14 and into the memory/program storage device 10c of the computer system 10 of FIG. 1. The computer system 10 of FIG. 1 is responsive to certain 'Input Data' 13, the 'Input Data' 13 being discussed in detail in later sections of this specification. The Processor 10a of computer system 10 will execute the 'Fault Modeling Software' 12 that is stored in memory 10c of FIG. 1 in response to the 'Input Data' 13; and, responsive thereto, the Processor 10a will generate an 'output display' that is recorded or displayed on the Recorder or Display device 10d of FIG. 1. The computer system 10 of FIG. 1 may be a personal computer (PC), a workstation, a microprocessor, or a mainframe. Examples of possible workstations include a Dell Precision M90 workstation or a HP Pavilion workstation or a Sun ULTRA workstation or a Sun BLADE workstation. The memory or program storage device 10c (including the above referenced CD-ROM 14) is a 'computer readable medium' or a 'program storage device' which is readable by a machine, such as the Processor 10a. The Processor 10a may be, for example, a microprocessor, microcontroller, or a mainframe or workstation processor. The memory or program storage device 10c and 14, which stores the 'Fault Modeling Software' 12, may be, for example, a hard disk, ROM, CD-ROM, DRAM, or other RAM, flash memory, magnetic storage, optical storage, registers, or other volatile and/or non-volatile memory.

Referring to FIGS. 2 and 3, a block diagram describing the function practiced by a first embodiment of the Fault Modeling Software 12 of FIG. 1 is illustrated.

In FIGS. 2 and 3, a first embodiment of the Fault Modeling Software 12 practices the 'interactive automation of fault modeling' process, and the 'interactive automation of fault modeling' process actually performs and practices a 'Method for Intelligently Sensing (i.e., intellisensing) Fault-Fault relationships', by performing or practicing or executing the following steps:

(1) Computing models of each fault as if each fault were unrelated to any other fault, step 16 of FIG. 2, (2) Keeping unrelated models of each fault up-to-date as new interpretation data are produced, step 18 of FIG. 2, (3) Detecting a condition whereby data associated with one fault (i.e., the fault being interpreted) indicates that the fault being interpreted is 'close to' one or more other faults, step 20 of FIG. 2 (see FIG. 15 for 'Fault Proximity Detection'), (4) Presenting, in a pop-up window, the one or more potentially related faults to the interpreter, the interpreter confirming or denying, in a response, that a connection relationship between the potentially related faults is valid, step 22 of FIG. 2, (5) Recording the response from the interpreter and, if the connection relationship is confirmed by the interpreter, computing all connection relationship properties, step 24 of FIG. 3, (6) Adding intersection curve and other connection properties, representing new interpretations, to the fault which embeds the connection relationship in with the interpretation data, step 26 of FIG. 3, and (7) Optionally computing and displaying the final model to illustrate the faults as being connected, that is, as being intersected, step 28 of FIG. 3, where the final model includes also a 'final' intersection curve separate from the intersection curve of step (6), which is interpretation data. All elements of the final model are dynamic, that is, recalculated whenever any part of the interpretation is changed, and this includes the final intersection curve.

The steps 16 through 28 of FIGS. 2 and 3 referenced above will be discussed below in greater detail with reference to FIGS. 6 through 19 of the drawings.

Figure 5:
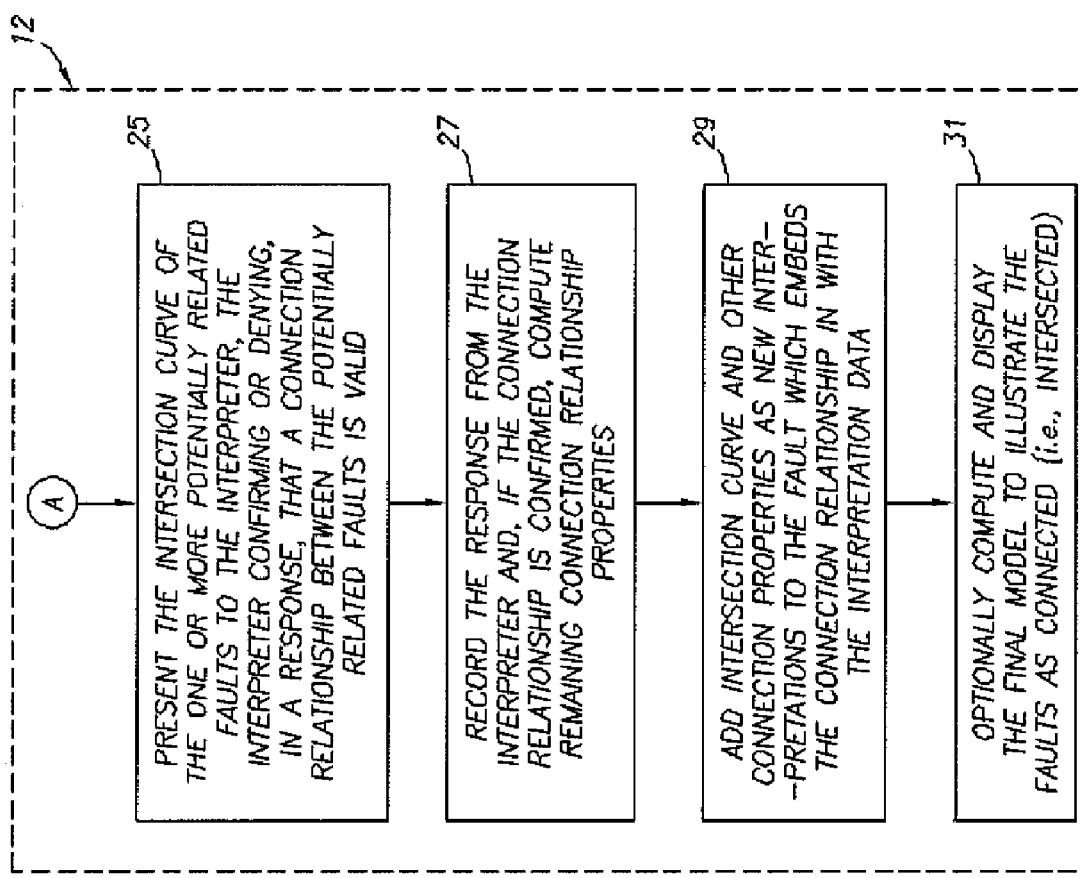
FIGS. 4 and 5 illustrate a block diagram describing a second embodiment (B) of the function practiced by the Fault Modeling Software of FIG. 1.
Figure 4:
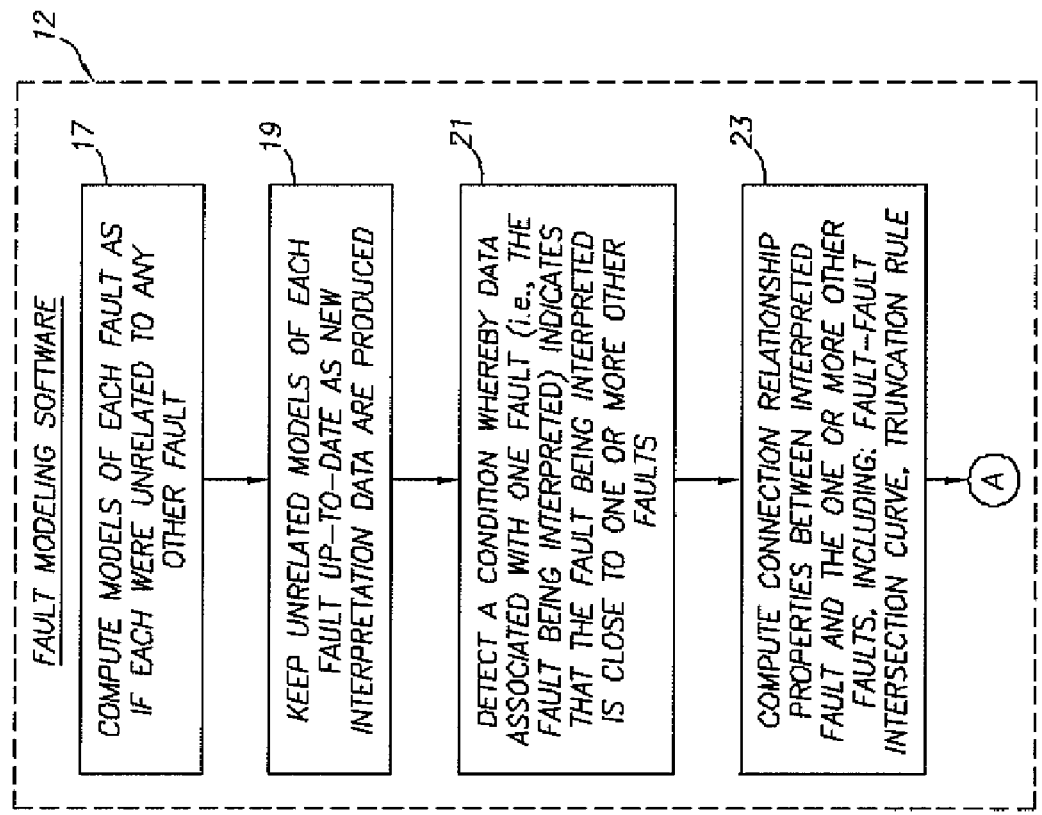

Referring to FIGS. 4 and 5, a block diagram describing the function practiced by a second embodiment of the Fault Modeling Software 12 of FIG. 1 is illustrated.

In FIGS. 4 and 5, a second embodiment of the Fault Modeling Software 12 practices the 'interactive automation of fault modeling' process, and the 'interactive automation of fault modeling' process actually performs and practices a 'Method for Intelligently Sensing (i.e. intellisensing) Fault-Fault relationships', by performing or practicing or executing the following steps:

(1) Computing models of each fault as if each fault were unrelated to any other fault, step 17 of FIG. 4, (2) Keeping un-related models of each fault up-to-date as new interpretation data are produced, step 19 of FIG. 4, (3) Detecting a condition whereby data associated with one fault (i.e., the fault being interpreted) indicates that the fault being interpreted is 'close to' one or more other faults, step 21 of FIG. 4 (see FIG. 15 of 'Fault Proximity Detection'), (4) Computing connection relationship properties between the interpreted fault and the one or more other faults, including: fault-fault intersection curve and truncation rule, step 23 of FIG. 4, (5) Presenting the intersection curve of the one or more potentially related faults to the interpreter, the interpreter confirming or denying, in a response, that a connection relationship between the potentially related faults is valid, step 25 of FIG. 5, (6) Recording the response from the interpreter and, if the connection relationship is confirmed by the interpreter, computing remaining connection relationship properties, step 27 of FIG. 5, (7) Adding the intersection curve and other connection properties, representing new interpretations, to the fault which embeds the connection relationship in with the interpretation data, step 29 of FIG. 5, and (8) Optionally computing and displaying the final model to illustrate the faults as being connected, that is, as being intersected, step 31 of FIG. 5, where the final model includes also a 'final' intersection curve separate from the intersection curve of step (6), which is interpretation data. All elements of the final model are dynamic, that is, recalculated whenever any part of the interpretation is changed, and this includes the final intersection curve The steps 17 through 31 of FIGS. 4 and 5 referenced above will be discussed below in greater detail with reference to FIGS. 6 through 19 of the drawings.

Figure 6:
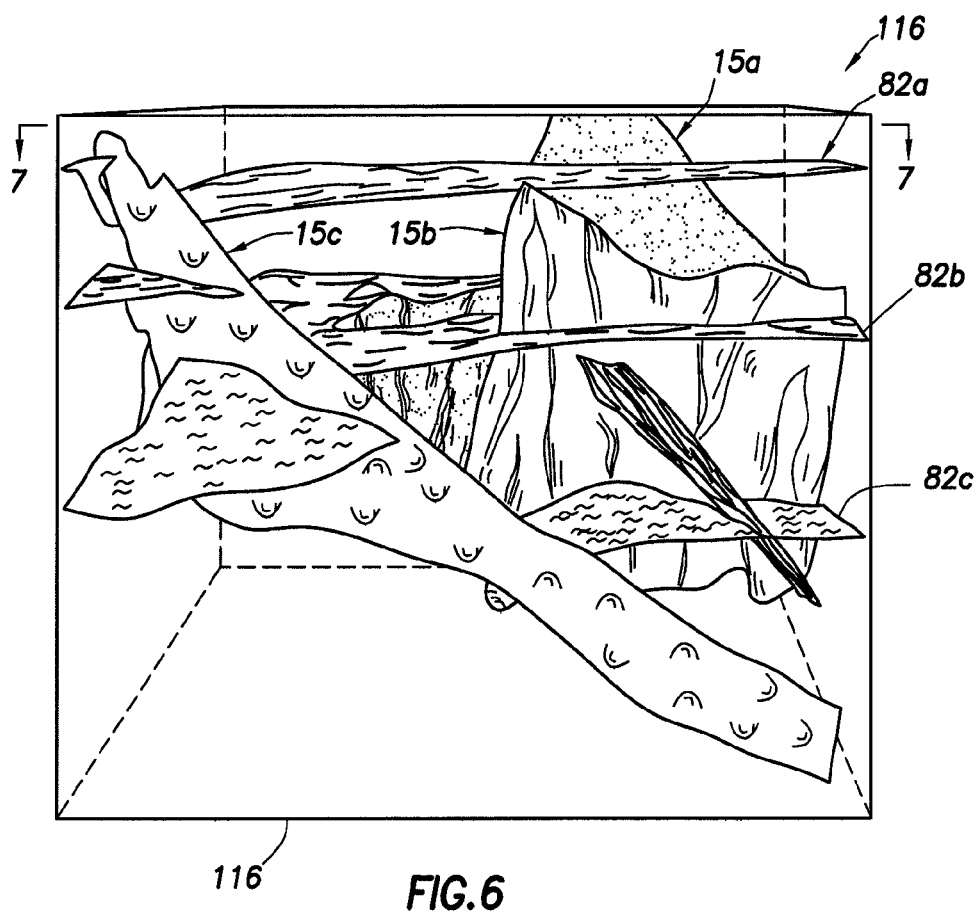
FIG. 6 illustrates one example of a structural model of horizons and faults in a fault ridden earth formation.
Figure 7:
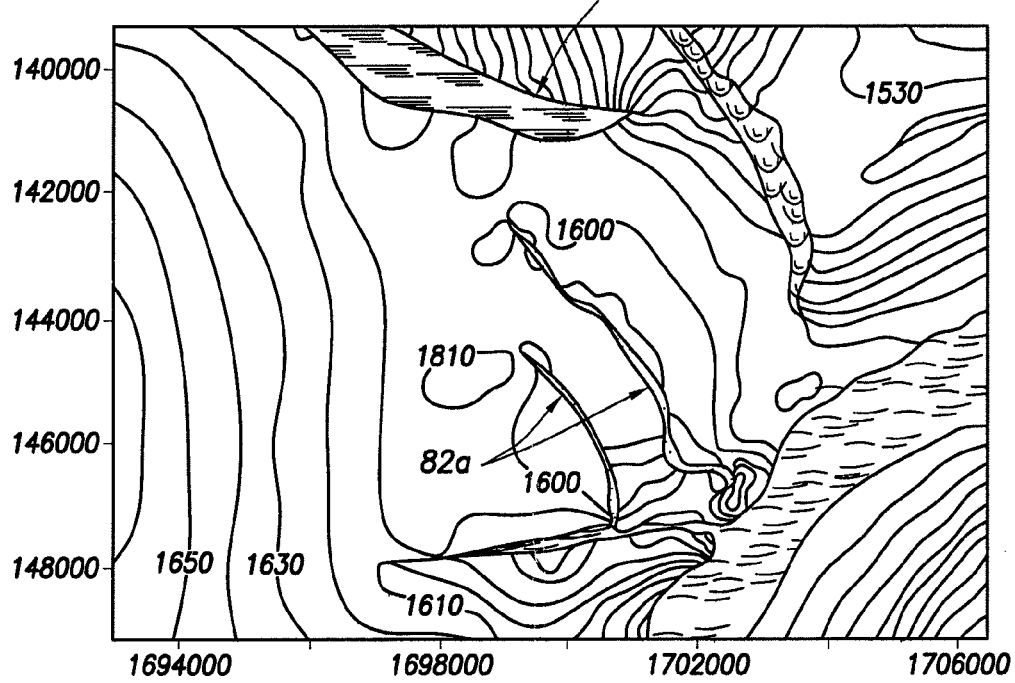
FIG. 7 illustrates a top view of horizon 82b in FIG. 6 taken along section line 7-7 of FIG. 6.

Refer to FIGS. 6 and 7. FIGS. 6 and 7 refer to an example of a structural model consisting of horizons and faults. FIG. 6 presents a three-dimensional representation of this model with FIG. 7 representing a depth slice (section line 7-7) through the model.

In FIGS. 6 and 7, referring initially to FIG. 6, an example of a reservoir structural model of faults and horizons 116 is illustrated in FIG. 6. The faulted horizon model 116 of FIG. 6 is a three dimensional representation of a section of an earth formation, where the earth formation is comprised of a multitude of horizons intersected by a plurality of faults. For example, in FIG. 6, an earth formation having a number of horizons are intersected by a number of faults, and in FIG. 6, a number of horizons 82*a*, 82*b*, and 82*c* are intersected, respectively, by the number of faults 15*a*, 15*b*, and 15*c*. In FIG. 6, the faulted horizon model 116 is a 3-D view of the earth formation showing a number of horizons 82*a*, 82*b*, and 82*c* which are intersected by a number of faults 15*a*, 15*b*, and 15*c*. In FIG. 7, a map of one of the horizons 82*a*, 82*b*, 82*c* of FIG. 6 is illustrated, the term 'map' being defined as being a top view of one of the horizons 82*a*, 82*b*, 82*c* in FIG. 6. For example, the 'map' illustrated in FIG. 7 shows a top view of horizon 82*a* in FIG. 6, the top view of horizon 82*a* being viewed downwardly in FIG. 6 along section lines 7-7 of FIG. 6. In FIG. 7, note the fault zones 15*a*.

Figure 8:
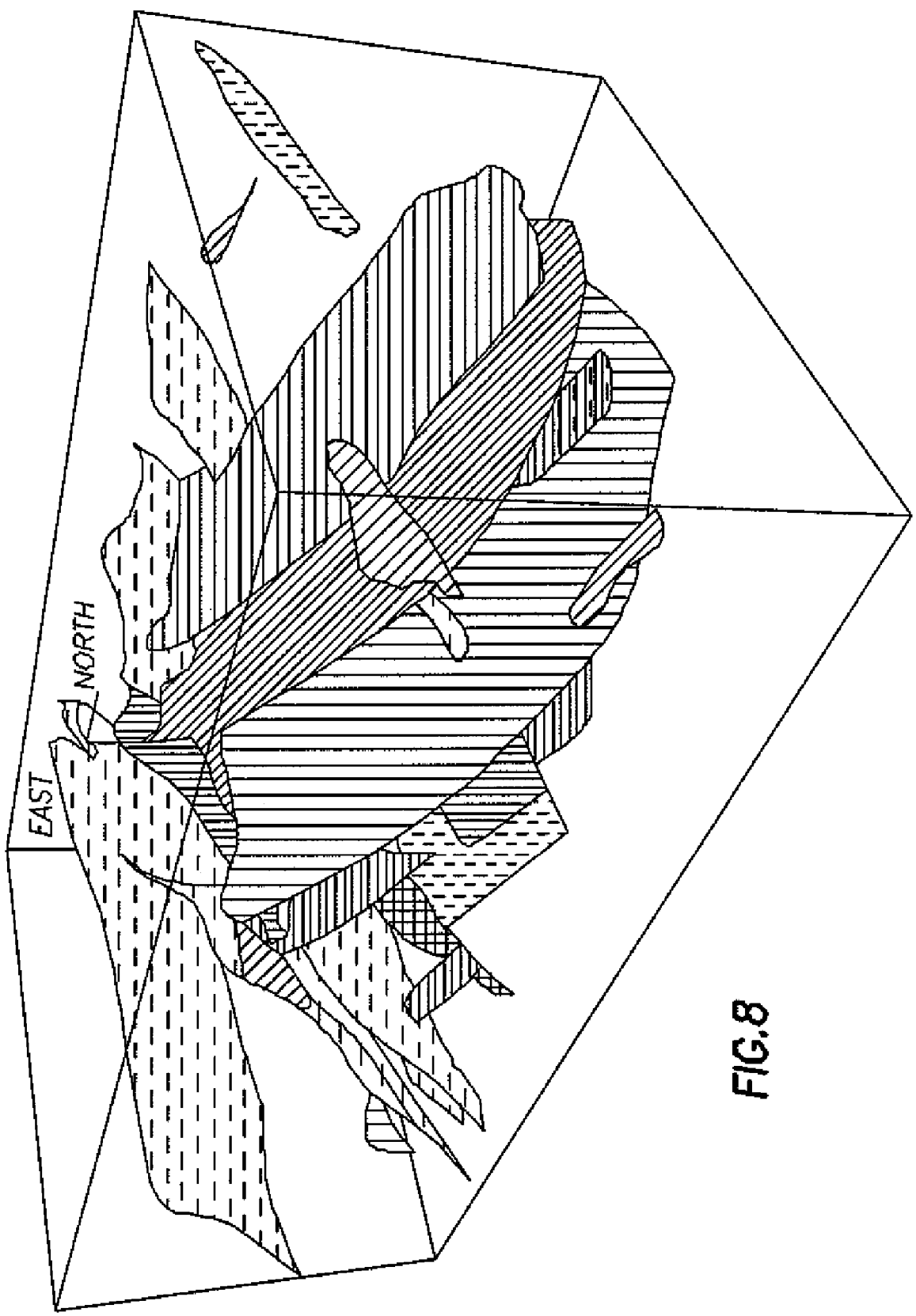
FIG. 8 illustrates a network comprised entirely of faults.

Referring to FIG. 8, an Earth formation model including a network comprised entirely of faults is illustrated.

In FIG. 8, in connection with the aforementioned 'Method for Interactive Automation of Fault Modeling', including the 'Method for Intelligently Sensing (i.e., Intellisensing) Fault-Fault Relationships', a typical approach to building a structural model is to start by 'building the fault structures'. The step of 'building the fault structures' requires fault interpretation data, which is typically extracted from seismic data. The process of developing a 'structural model' is facilitated with the construction of a fault framework within which horizons are interpreted. FIG. 8 illustrates a fault framework comprised entirely of faults.

Figure 10:
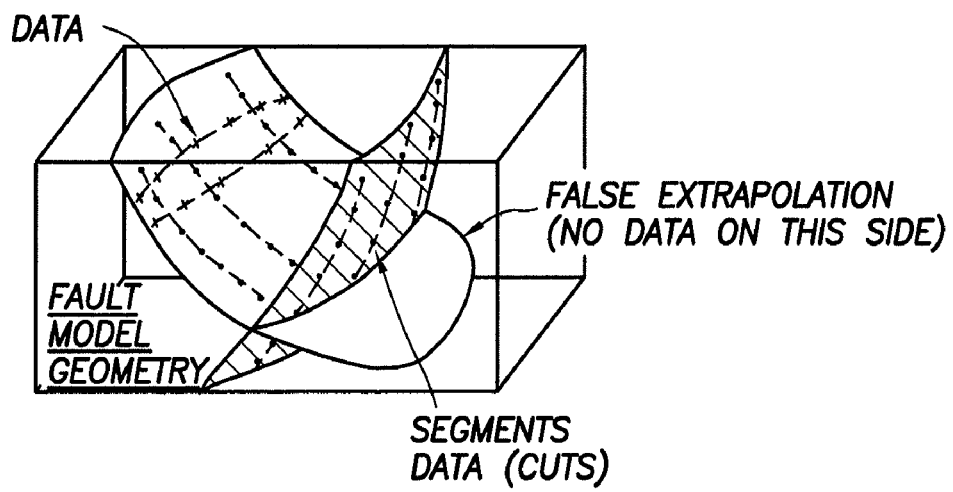
FIG. 10 illustrates fault interpretation data, also known as 'fault cuts', of two faults.

Referring to FIG. 10, the schematic shown in FIG. 10 illustrates a number of 'fault interpretation data' (also known as 'fault cuts') where the 'fault interpretation data' depicts or represents two faults. In FIG. 10, a modeled representation is shown of each of the two faults, the modeled representation initially showing a 'connection relationship' among the two faults shown in FIG. 10. The 'connection relationship' of the two faults shown in FIG. 10 is evidenced by one fault piercing the other fault, thereby creating an 'intersection' between the two faults. Therefore, given the 'fault-fault relationship' shown in FIG. 10, one of the faults can be cut back (i.e., truncated or trimmed) to the 'intersection', as shown in FIG. 10.

Referring to FIGS. 9, 11, 12, and 13, various illustrations of fault relationships, applied or not applied, are shown in FIGS. 9, 11, 12, and 13.

Figure 9:
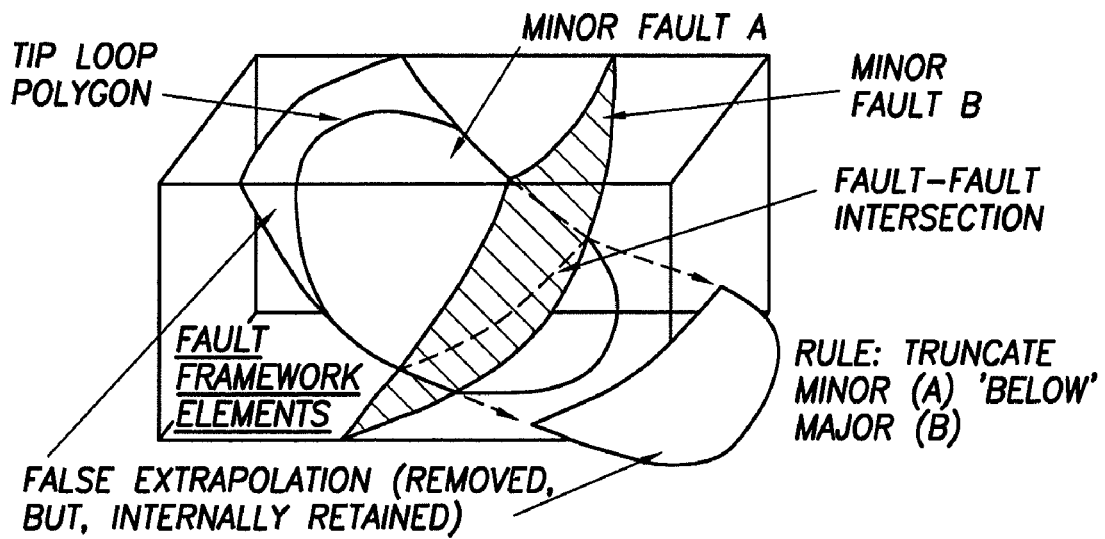

In FIG. 9, an illustration of 'fault framework elements' is shown in FIG. 9. In FIG. 9, the fault framework manages and stores the various data objects computed during the building process. These objects include minor faults truncated against their related major fault, requiring storage of fault-fault intersection lines, and all established fault relationships. Some of these elements are shown in FIG. 9.

In FIGS. 11 and 12, two faults 34 and 36 can intersect in the manner shown in FIG. 11; however, two faults 30 and 32 can also intersect in the manner shown in FIG. 12. In FIG. 12, a major fault 30 is intersected by a minor fault 32, however, the minor fault 32 is truncated below the major fault 30.

In FIG. 13, still another example illustration of fault model elements is shown in FIG. 13. The main elements are the real part, which fits to fault cut data, the imaginary or extrapolated part, and the fault edge, which is the interface between the real and imaginary. The edge is also called the tip loop.

The Fault Modeling Software 12 of FIG. 1, which practices the 'Interactive Automation of Fault Modeling' process, including the 'Method for Intelligently Sensing (i.e., intellisensing) Fault-Fault relationships', is formally known as a 'Fault Modeling Service', the 'Fault Modeling Service' being incorporated within a 'fault interpretation workflow'.

In order to activate (or deactivate) the 'Fault Modeling Service' associated with the Fault Modeling Software 12 of FIG. 1, a 'setup dialog' will be used, the 'setup dialog' being displayed on the Recorder or Display Device 10d of FIG. 1.

The 'setup dialog' includes the following information:

(1) 'Framework fault modeling' is an 'on/off toggle' which activates fault modeling while interpreting and the fault intellisensing process. When toggled 'on', parameters may be set to control the fault modeling service.

(2) 'Fault-fault connection distance, default 200' controls the sensitivity to intellisensing other faults nearby an interpreted fault. Likewise, it also controls the distance an interpreted fault is extrapolated to connect and form an intersection with the nearby fault.

(3) 'Fault smoothing, default 2' controls the number of smoothing passes when modeling a fault.

(4) 'Fault tip loop style, default isotropic extrapolation' controls the general shape of the tip loop. Options include:
Isotropic Extrapolation—Extrapolate fault equally in all directions.
Anisotropic Extrapolation—Extrapolate fault in horizontal direction with no vertical extrapolation.
Sculpted—Shrink-wrapped fit to interpretation data.

(5) 'Fault tip loop quality factor, default 1' controls the detail quality of the tip loop, ranging from good (1), better (2), best (4).

(6) 'Fault extrapolation distance, default 50' controls extrapolation of the model beyond its data. It is used only for tip loop styles 'isotropic extrapolation' and 'anisotropic extrapolation.'

(7) 'Fault tip loop sculpting diameter, default 400' controls the degree to which the tip loops sculpts between edge data points. This sets the size (diameter) of a ball rolling around the edge of data traversing the tip loop location, the smaller the diameter, the more the ball (tip loop) sculpts between data points.

Except for the 'Framework fault modeling' on/off toggle, all of these parameters can be set individually for each fault. The 'setup dialog' sets 'global defaults.' These settings are then used and copied as defaults for fault modeling the first time a fault is modeled.

The selection of faults, for the purpose of interpreting and modeling into a framework, is a dynamic process. The interpreter may decide to include a fault for modeling, then, the interpreter may exclude the fault. For example, if the interpreter decides the fault is insignificant for the task at hand, the interpreter may exclude the fault; however, the interpreter may also decide to add the fault back in again and carry on with interpretation/modeling. Similarly, the user may modify/edit an existing fault as his/her interpretation matures.

The term 'Fault-Fault connection distance' (referenced below) is the distance used in the 'Method for Interactive Automation of Fault Modeling' including the 'Method for Intelligently Sensing (i.e., Intellisensing) Fault-Fault Relationships' disclosed in this specification. In particular, the term 'Fault-Fault connection distance' is used in order to initially sense that 'two faults' are 'close'; and, when the 'two faults' are determined to be 'close', the 'two faults' may be 'related'. If the 'two faults' are 'related, the 'two faults' may then be 'connected into a fault-fault relationship'. See FIG. 15 for a number of steps involving 'Fault Proximity Detection' wherein, in accordance with the steps of FIG. 15, the 'two faults' can be determined to be 'close to' each other, or 'proximate to' each other, or 'in proximity to' each other.

During interpretation, when 'Framework fault modeling' is active, fault intellisensing will use a 'pop-up style' of dialoging, or will flash the fault-fault intersection curve on the display, as a way of notifying to the interpreter decisions made by modeling algorithms in regards to 'Fault Proximity Detection', then allowing confirmation or rejection by the interpreter. The modeling software is aware of the full set of faults having been interpreted or partially interpreted, while the interpreter is focused on one or a few faults at a time. Interpretation is interrupted when 'intellisense fault modeling' detects another one or more faults in the vicinity of the fault being interpreted. A pop-up dialog lists the faults within the 'parameterized distance' (i.e., within the 'Fault-fault connection distance'), or they are inferred by flashing intersection curves on the display. The interpreter accepts or rejects each potential relationship, then continues with interpretation. Accepting or rejecting is accomplished either through dialog interaction or graphical canvas interaction, or both. Each decision is remembered by the Fault Modeling Software 12. A 'reject' decision prevents any recurrence of the same fault pair from being shown again to the interpreter, by default, although this decision can be later rescinded, if needed. However, an 'accept' decision causes truncation rules to be calculated and display of the final (truncated) model. The 'Intellisensing' (performed and practiced by the Fault Modeling Software 12) performs at interactive speed and truncation performs at near-interactive speeds.

The final model includes also a 'final' intersection curve which is separate from the intersection curve computed and displayed earlier, which is interpretation data. All elements of the final model are dynamic, i.e., recalculated whenever any part of the interpretation is changed, and this includes the final intersection curve.

Figure 14:
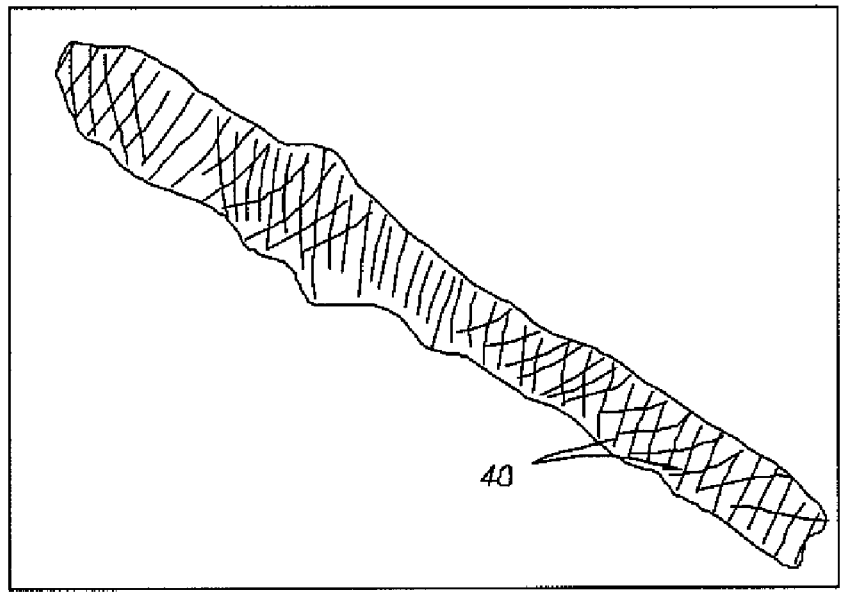
FIG. 14 illustrates how a fault edge (tip loop) would appear when modeled unrelated to any other fault.

Refer now to FIG. 14.

FIG. 14 shows how a fault edge (tip loop) would look modeled unrelated to any other fault, which is actually the 'default interpretation model'. This model is continuously updated as 'interpretations' are added. In FIG. 14, the 'interpretations' that are added are represented by the lines 40 in FIG. 11.

When the fault is modeled 'unrelated to' any other fault, step 16 of FIG. 2 and step 17 of FIG. 4, the following elements are included and enable 'interactive performance' of the fault intellisensing workflow:

1. Optimal Fault Model—a fault model, in some optimal coordinate system, known to provide a balance between performance and accuracy in fault intellisensing calculations; also, may be called a fault model space. One such optimal space is a so-called 'best-fit-plane' Cartesian coordinate system oriented where the X-Y coordinate plane is parallel to an overall trend of the fault data. The Z-axis can then be taken as an average normal to the fault. A key calculation in fault intellisensing is to quickly measure in some approximate way the distance from an arbitrary 3D point, i.e., an interpretation point P(x,y,z), to the fault, represented as some function, F(x,y). In this calculation, the direction normal to the fault is required. Using a 'best-fit-plane' type of optimal fault model, the normal direction is approximated as the Z-axis direction so that a distance calculation, d, is a simple subtraction of Z-components:

$$d=Pz-F(x,y)$$

In the alternative, a more accurate distance calculation may be applied taking into account curvature of the fault. In addition to a 'best-fit-plane' type of model space, other fault model spaces are considered to exist which serve a similar purpose of balancing performance and accuracy in the intellisensing workflow for interactive response times.

2. Real and Imaginary Model Components the fault model is a finite-element representation of the fault at regularly-spaced discrete locations. Each location has an added classification as real or imaginary, a binary state, computed when the fault model is computed and preserved as a component of the model. When evaluating an arbitrary 3D point, i.e., an interpretation point P(x,y,z), against the fault, F(x,y), in a direction normal to the fault (as in the distance calculation above), the same binary state (real vs. imaginary) is applied to the point. This is so the fault intellisensing workflow is sensitive to fault termination at the tip loop boundary and does not sense or detect a fault as proximate if past its edge. Interpretation points, P(x,y,z), projecting outside the bounds of the fault, i.e., onto imaginary parts, are treated differently from points projecting onto real parts of the fault.

Figure 15:
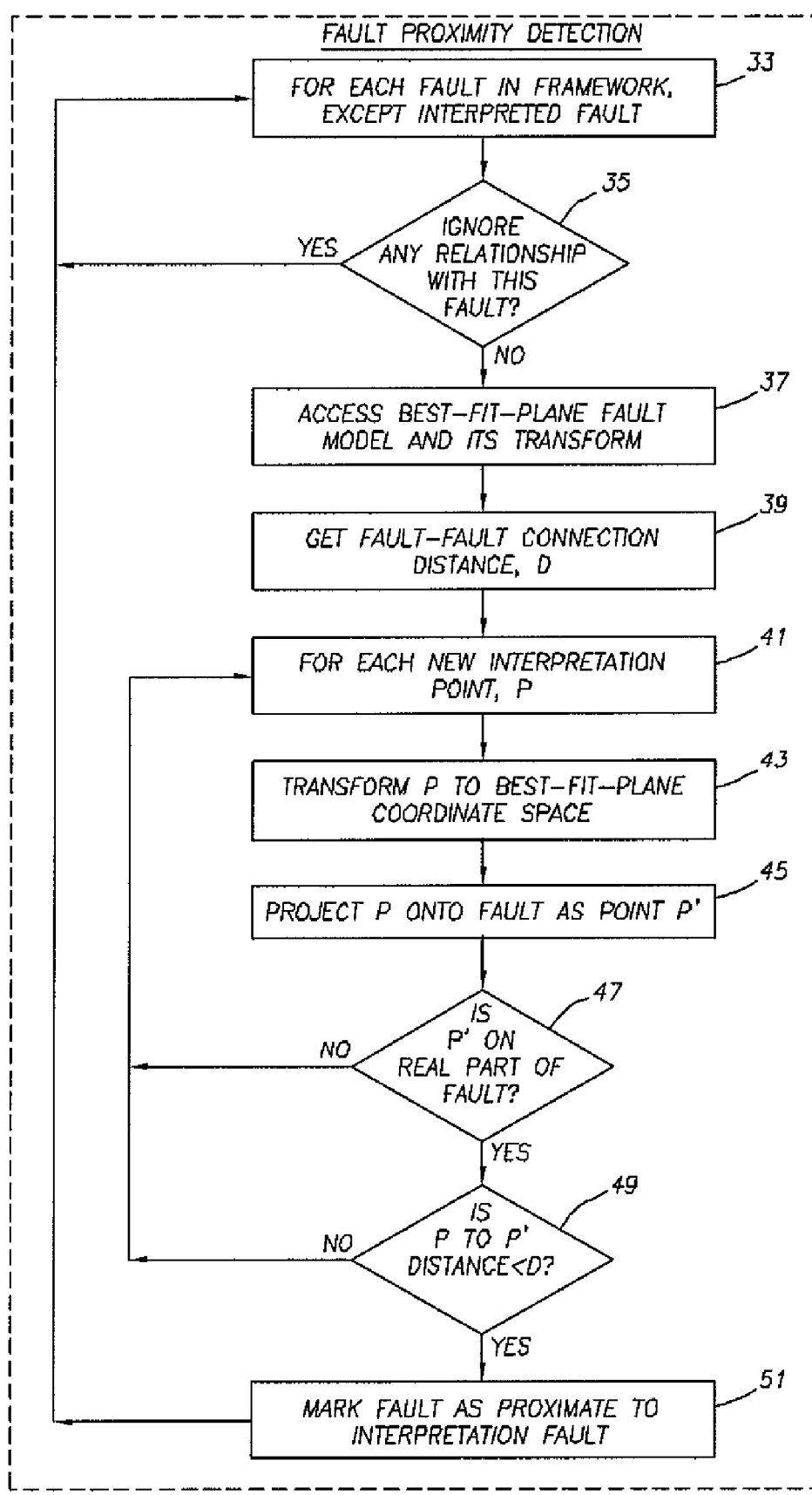
FIG. 15 describes processing steps used to detect presence of another fault nearby one being interpreted, FIG. 15 (including a plurality of steps relating to 'Fault Proximity Detection') being a detailed construction of the 'close to' step 20 of FIG. 2, FIG. 15 also being a detailed construction of the 'close to' step 21 of FIG. 4.

Referring to FIG. 15, a method of 'Proximity Detection' is illustrated. Each interpretation point is checked for whether it is 'in proximity to' (or whether it is 'close to' or 'proximate to') other faults. The term 'proximity to' or 'proximate to' or 'close to', by definition, refers to an 'approximate normal distance of each interpretation point to all other faults'. In connection with the term 'close to', wherein one fault is tested to be 'close to' another fault, a 'method of proximity detection' is described in FIG. 15. In FIG. 15, the 'method of proximity detection' (wherein one fault is tested to be 'close to' or 'proximate to' or 'in close proximity to' another fault) includes the following steps;

(1) In connection with each fault in the framework, except for the 'interpreted fault', step 33 of FIG. 15, (2) Should we ignore any relationship with this fault, step 35 in FIG. 15, (3) If yes, return to step 33, but, if no, access 'best-fit plane' fault model and its transform, step 37 of FIG. 15, (4) Get the 'fault-fault connection distance', step 39 of FIG. 15, (5) For each new interpretation point 'P', step 41 of FIG. 15, (6) Transform 'P' to 'best-fit plane' coordinate space', step 43 of FIG. 15, (7) Project 'P' onto the fault as point P' (i.e., point P prime), step 45 of FIG. 15, (8) Is point P' (i.e., point P prime) on real part of fault?, step 47 of FIG. 15, (9) Is the P to P' distance<D? (i.e., is the P to P prime distance less than D?), step 49 of FIG. 15, (10) If no, return to step 41, but, if yes, mark the fault as 'proximate to' (or 'close to' or 'in close proximity to') the interpretation fault, step 51 of FIG. 15. In operation, referring to FIG. 15, in connection with the 'method of proximity detection', each new interpretation point is tested for proximity to all other faults. For a given fault, each point, P, is projected to a location, P', onto the fault in a direction approximately normal to the fault. P' must fall within the real part of the fault (see FIG. 13 for an illustration of real vs. imaginary fault parts). To achieve interactive performance, an optimal fault model is used for proximity computation. Each point, P, is transformed to the fault model space (which can be a simple transform from one 3D Cartesian coordinate system to another 3D Cartesian coordinate system). The distance from P to P' can then be a simple difference between P to P' Z-components and this difference is compared with the fault-fault connection distance, D, to evaluate if the fault is sufficiently close to an interpretation. Or, a more exact P', and corresponding distance, may be evaluated taking into account curvature of the fault. P' is then evaluated for its real or imaginary location within the fault model.

Special transforms are used to achieve interactive performance and to account for fault edges—the tip loop. A point projecting outside a fault's edge will not trigger a potential relationship.

One or more points of a first fault that lies within the 'Fault-fault connection distance' to another second fault causes that first fault to be presented to the interpreter in the 'pop-up list', or presented by flashing the 'fault-fault intersection curve' on the display, unless that first fault has already been rejected as 'unrelated'.

Figure 16:
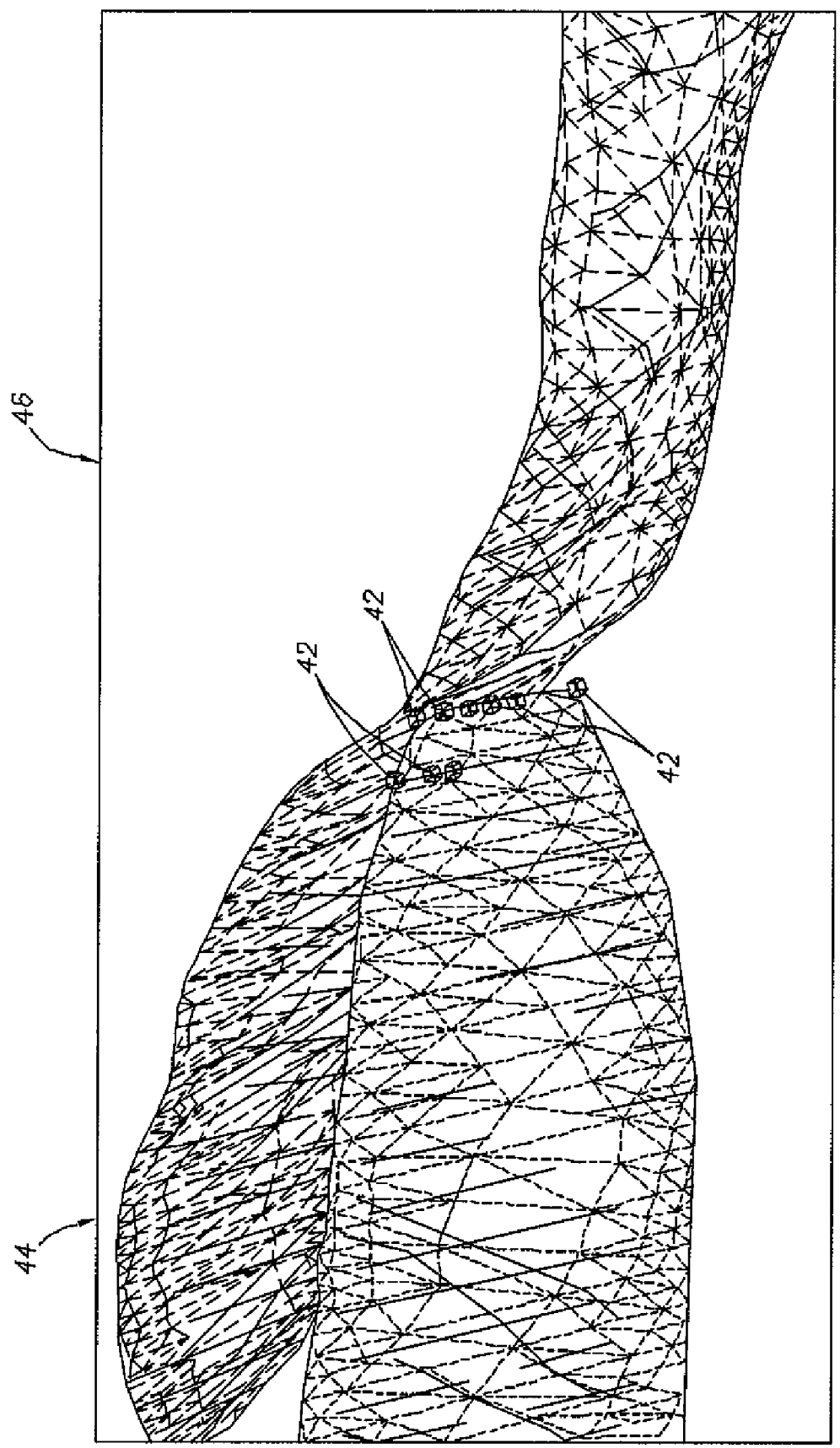
FIG. 16 illustrates a set of points (centrally located in the figure) that are located proximate to a right-most truncating fault.

Referring to FIG. 16, this FIG. 16 illustrates a set of points 42 on a left-most fault 44 that are located 'proximate to' the right-most (truncating) fault 46 in FIG. 16, thereby generating a 'fault-fault relationship' between the left-most fault 44 and the right-most fault 46. Therefore, the right-most (truncating) fault 46 would show up in the 'pop-up list', or shown by flashing the 'fault-fault intersection curve' on the display, which is being presented to the interpreter on the Recorder or Display device 10d of FIG. 1. The interpreter, upon viewing the 'pop-up list', or viewing the flashing of the 'fault-fault intersection curve', on the Recorder or Display device 10d, must confirm that the aforementioned 'fault-fault relationship' is valid.

Figure 17:
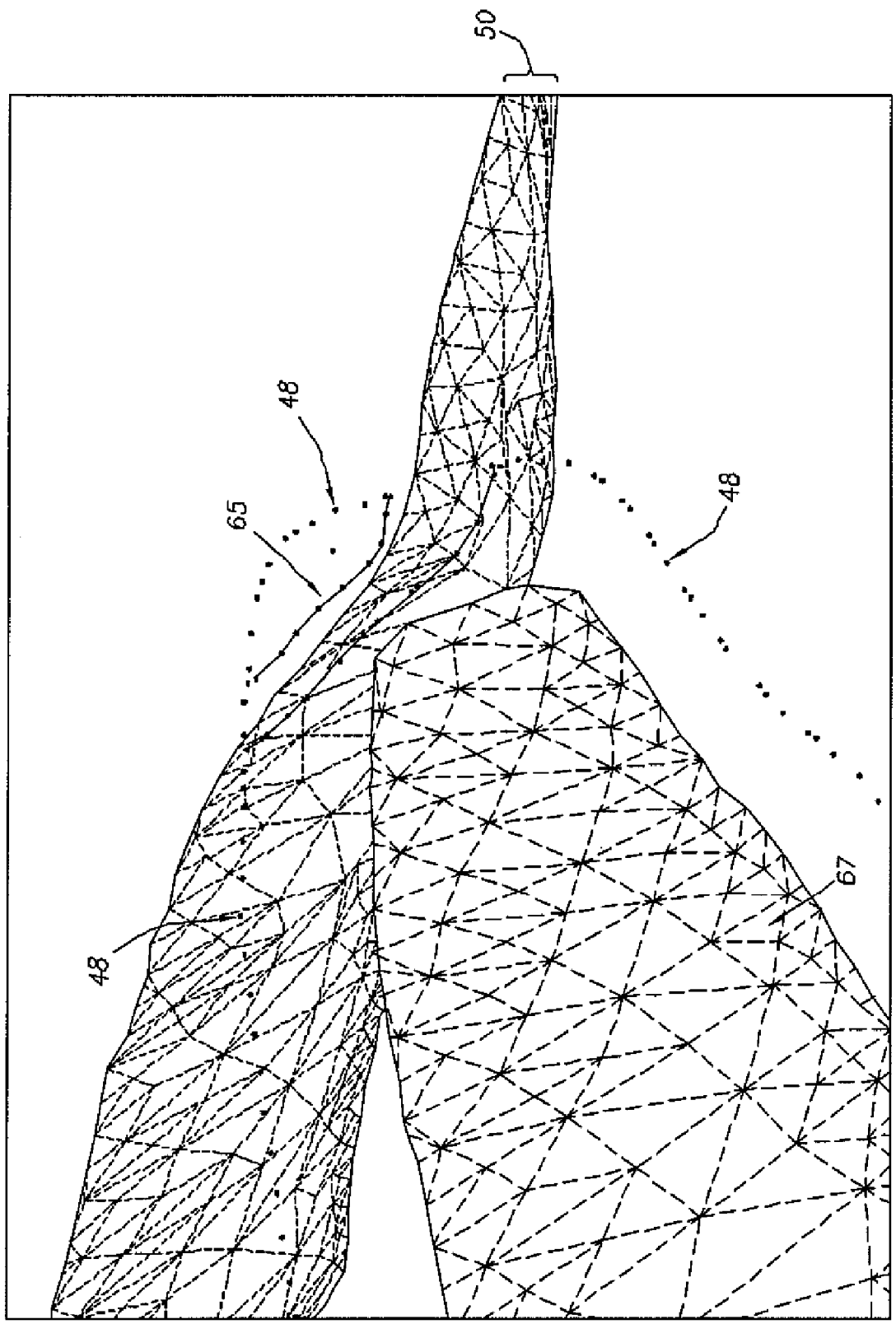
FIG. 17 illustrates that, after an interpreter confirms that a fault-fault relationship is valid, the intersection of the two faults is modeled, as indicated by a longest line that is shown in FIG. 17.

Referring to FIG. 17, after the interpreter confirms that the aforementioned 'fault-fault relationship' is valid, the intersection of the two faults 44 and 46 of FIG. 16 is 'modeled' if not already modeled, as indicated by the 'longest line' 48 appearing in FIG. 17. This 'longest line' 48 curve is likely longer than it needs to be, and is purposely modeled past where it should structurally terminate. This 'intersection interpretation' (represented by the 'longest line' 48 in FIG. 17) is then added to the 'set of fault interpretations' (i.e., the ones manually picked), and is treated like any other interpretation. Although an exact intersection at this stage, its main purpose is to interpret the fault near the related truncating fault. The final intersection curve is modeled later, separate from this step, and stored separately as a model entity, apart from its complementary interpretation entity. Fault framework modeling, where fault truncation is applied, computes this modeled intersection.

Figure 19:
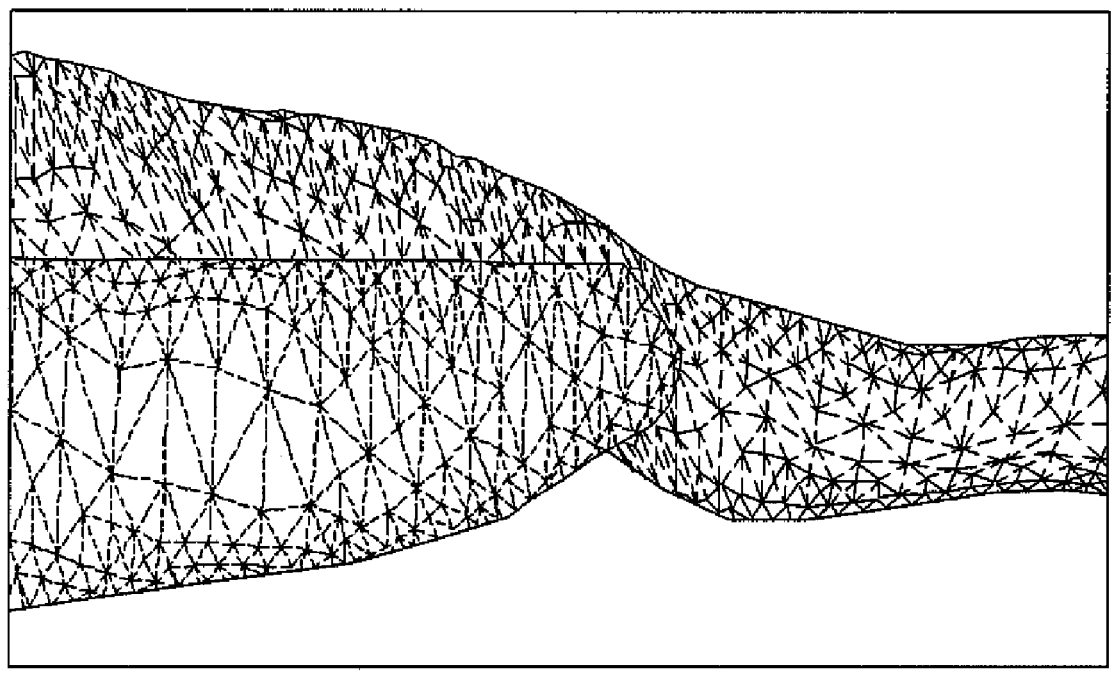
FIG. 19 illustrates the final model of two related faults, where one fault is modeled up to, and terminates at, the common intersection with another fault.

Referring to FIGS. 3, 5, and 19, referring initially to FIG. 19, the model shown in FIG. 19 represents a 'final model' of 'two related faults', where one fault is modeled up to, and terminates at, the common intersection with another fault; see " . . . display the related model to illustrate the faults as connected (i.e., intersected)" in step 28 of FIG. 3, and see " . . . display the final model to illustrate the faults as connected (i.e., intersected)" in step 31 of FIG. 5.

In FIG. 17, the 'computed intersection curve' is represented by the 'longest line' 48 shown in FIG. 17. Storing the 'computed intersection curve' (represented by the 'longest line' 48 in FIG. 17), along with the other interpretations, allows edits and adjustments to be made, as one would do to any interpretation. The estimated intersection can be altered, if needed. By co-mingling a modeled curve in with ordinary interpretation data, this step further binds and integrates the modeling workflow in with the interpretation workflow.

Figure 18:
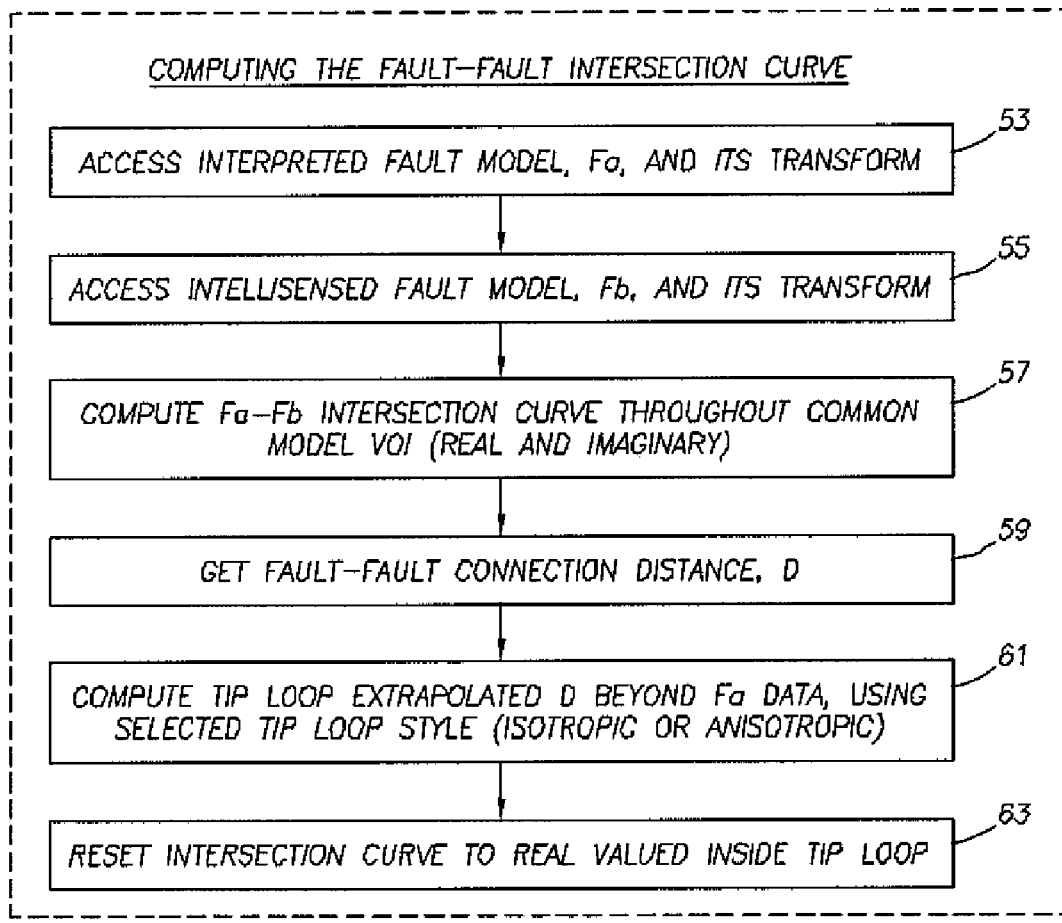
FIG. 18 describes processing steps used to project an interpreted fault to a nearby fault and compute the common 'Fault-Fault intersection curve', FIG. 18 being a detailed construction of step 28 in FIG. 3, FIG. 18 also being a detailed construction of step 31 of FIG. 5.

Referring to FIG. 18, a more detailed construction of step 28 of FIG. 3 and step 31 of FIG. 5 is illustrated. In FIG. 18, a method for computing a 'Fault-Fault Intersection Curve' is illustrated, the method being adapted for computing the 'computed intersection curve' also known as the 'fault-fault intersection curve' represented by the 'longest line' 48 shown in FIG. 17. In FIG. 18, a number of steps 53 through 63 are illustrated which are executed by the processor 10a of the computer system of FIG. 1 in order to compute the aforementioned 'computed intersection curve' which is also known as the 'Fault-Fault Intersection Curve'. When the processor 10a of the computer system 10 of FIG. 1 executes the steps 53-63 of FIG. 18, the following steps are executed in sequence for the purpose of computing the 'fault-fault intersection curve': (1) Access interpreted fault model, Fa, and its transform, step 53 in FIG. 18, (2) Access intellisensed fault model, Fb, and its transform, step 55 of FIG. 18, (3) Compute (Fa–Fb) intersection curve throughout common model Volume of Interest (VOI), ordinarily comprising a curve of both real and imaginary parts, step 57 of FIG. 18, (4) Get fault-fault connection distance, D, step 59 of FIG. 18, (5) Compute tip loop extrapolated D beyond Fa data, using selected tip loop style (isotropic or anisotropic), step 61 of FIG. 18, and (6) Reset intersection curve to real valued inside tip loop, step 63 in FIG. 18. Referring to step 57 of FIG. 18, an 'untrimmed' intersection is computed and other steps are used to 'trim' it to the relevant part. Since all fault models are fully extrapolated throughout the model VOI (volume-of-interest)—component parts flagged as real or imaginary—the intersection curve will likewise extend throughout the model VOI as an extended or untrimmed intersection. In step 61 of FIG. 18 which computes an extrapolated tip loop, this step 61 is used to trim the intersection to the relevant, e.g., real, part.

In FIG. 17, a 'second curve' is computed, parallel to the intersection curve 48, offset on the opposing side of the truncating fault 50 in FIG. 13. This 'second curve' is a 'truncated interpretation' as indicated by the 'shorter line' 65 shown in FIG. 17. Its purpose is for modeling; that is, to initially model the truncated fault past the truncating fault during step 16 of FIG. 2, i.e., when the fault is modeled unrelated to any other fault. This allows a 'clean intersection' to be formed when the faults are modeled as related and intersected and the final model is computed. After intersection, the projected extension is removed using the relationship rule already established. This 'second curve' 65 of points is also added as additional fault interpretations. It allows edits and adjustments to be made, as one would do to any interpretation. This 'second curve' 65 can be altered, if needed. It also has the effect of further binding and integrating the modeling workflow in with the interpretation workflow.

In FIG. 17, storing the aforementioned 'second curve' 65 (which is offset on the opposing side of the truncating fault 50 in FIG. 17) as an interpretation allows the truncating fault 50 to be subsequently re-interpreted and pulled away from the truncated fault 67 in FIG. 17 without affecting the validity of the fault-fault relationship or its truncation rule. When rebuilding the fault framework, i.e., the pair of faults in FIG. 17, there would still exist a valid intersection, and the final truncated model could still be built. In this scenario, the 'modeled intersection' relocates to a position different from the 'interpretation intersection' computed earlier—the 'longest line' 48 in FIG. 17. Since one intersection curve is stored with the interpretation and the other stored as part of the final model (and recomputed as needed to ensure both faults join at a common location), fault re-interpretation scenarios are supported. If one or more connected faults are edited such that the line of intersection is no longer valid, the faults become 'active' or 'eligible' again within the Intellisensing process. The line of intersection between faults can be edited as well, while still retaining the fault-fault connection.

The 'second curve' 65 of FIG. 17 is one method used to 'pull' one fault model across another fault to effect intersection and truncation, but there are others. Given that the 'second curve' 65 is algorithmically conditioned oil the geometry of the fault model and the first (intersection) curve location, an explicit representation may be replaced with an implicit calculation or representation, and still achieve the same purpose of 'pulling' one fault model across another fault to effect intersection and truncation.

In FIG. 17, note the 'dotted line' 48 in the figure. This is the tip loop computed as described in FIG. 18, step 61. The 'fault-fault connection distance', D, is the distance the tip loop extends beyond data of the interpreted fault. Note that this same distance is used to initially detect proximity of the nearby fault, then used again to project the interpreted fault and capture its intersection with the nearby fault. When computing this tip loop, the optional style ('isotropic extrapolation' or 'anisotropic extrapolation') affects only the length of the intersection curve. In FIG. 17, 'isotropic extrapolation' was chosen as the 'fault tip loop style.' Selection of 'anisotropic extrapolation' would cause extrapolation in the horizontal direction with no vertical extrapolation, and have the possible effect of shortening the intersection curve.

Therefore, as part of the fault interpretation process, the 'interactive automation of fault modeling' process including the 'method for Intelligently Sensing fault-fault relationships', as shown in the first embodiment of FIGS. 2 and 3 and the second embodiment of FIGS. 4 and 5, will provide a non-intrusive intelligent system for aiding or coaching or assisting the interpreter to set 'fault-fault relationships' at an early stage and as fault interpretation matures. This process is called 'fault intellisensing' since the interpreter interactively responds to a 'pop-up list', or responds to a flashing of the fault-fault intersection curve on the display, being displayed on the Recorder or Display device 10d while performing the 'interpreting' function. The 'Intellisensing' function will suggest 'candidate faults' that perhaps should be connected to a 'second fault being interpreted' when the interpreter is interpreting the second fault. The interpreter either accepts or rejects these suggestions, in response to the 'Intellisensing' function, and the modeling system either makes or suppresses the connection.

Bundled as part of the fault interpretation process, the 'interactive automation of fault modeling' process including the 'method for Intelligently Sensing fault-fault relationships', as shown in the first embodiment of FIGS. 2 and 3 and the second embodiment of FIGS. 4 and 5, collectively implements a 'modeling event-driven decision making' process to solve for fault-fault relationships during fault interpretation.

In addition, as part of the fault interpretation process, the 'interactive automation of fault modeling' process including the 'method for Intelligently Sensing fault-fault relationships', as shown in the first embodiment of FIGS. 2 and 3 and the second embodiment of FIGS. 4 and 5, will add 'additional data' to the pool of interpretation data, where the additional data represents the 'intersection line' between the fault pair. This 'additional data' are akin to auto-interpretations, freeing up the interpreter from the need to interpret where faults intersect, and this 'additional data' establishes an approximate 'intersection location' between the fault pair, meaning that an exact intersection is solved and stored elsewhere when the entire fault framework is modeled and stored, i.e., the final model is produced.

In addition, as part of the fault interpretation process, the 'interactive automation of fault modeling' process including the 'method for Intelligently Sensing fault-fault relationships', as shown in the first embodiment of FIGS. 2 and 3 and the second embodiment of FIGS. 4 and 5, will add 'additional data' to the pool of interpretation data, the 'additional data' giving the interpreter some measure of freedom to subsequently move or edit one of the faults at a later time, yet still preserving the interpreter's ability to solve for a modeled connection between the faults.

Figure 20:
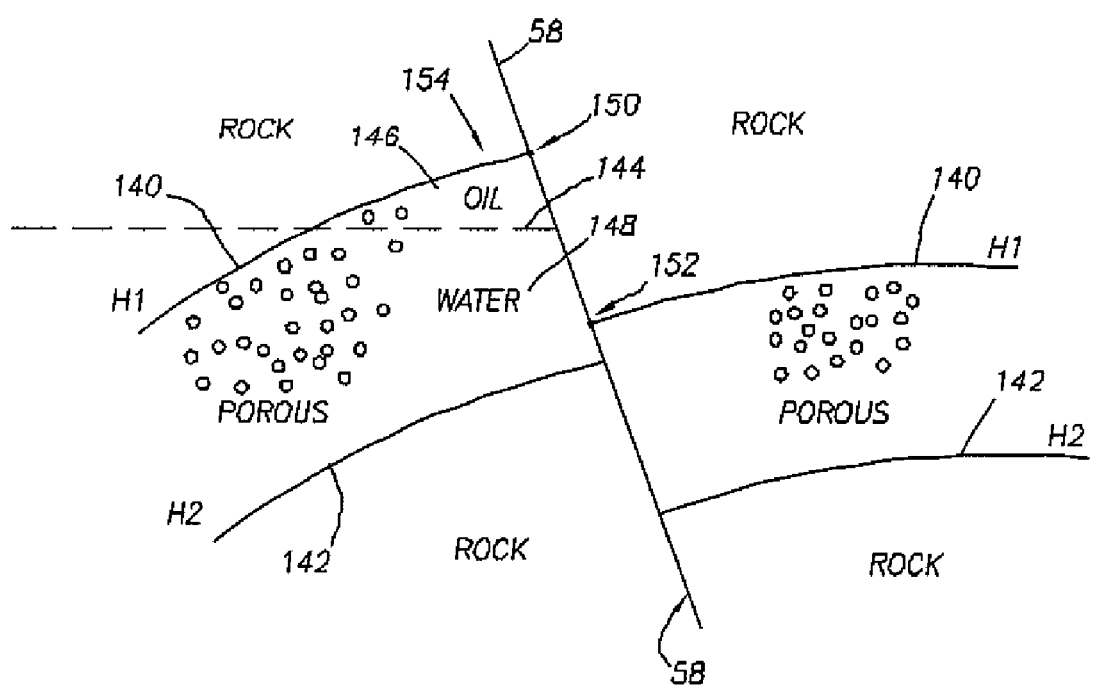
FIGS. 20 and 21 illustrate the ultimate purpose of the above referenced method for Fault Modeling illustrated in FIGS. 2 and 3 and in FIGS. 4 and 5, that is, to extract oil and/or gas from an Earth formation, FIG. 20 illustrating characteristics of the Earth formation including a location in the Earth formation wherein oil and/or gas is located, FIG. 21 illustrating a drilling rig that is disposed over that location in the Earth formation, the drilling rig being used for extracting the oil and/or gas from the location in the Earth formation of FIG. 20.
Figure 21:
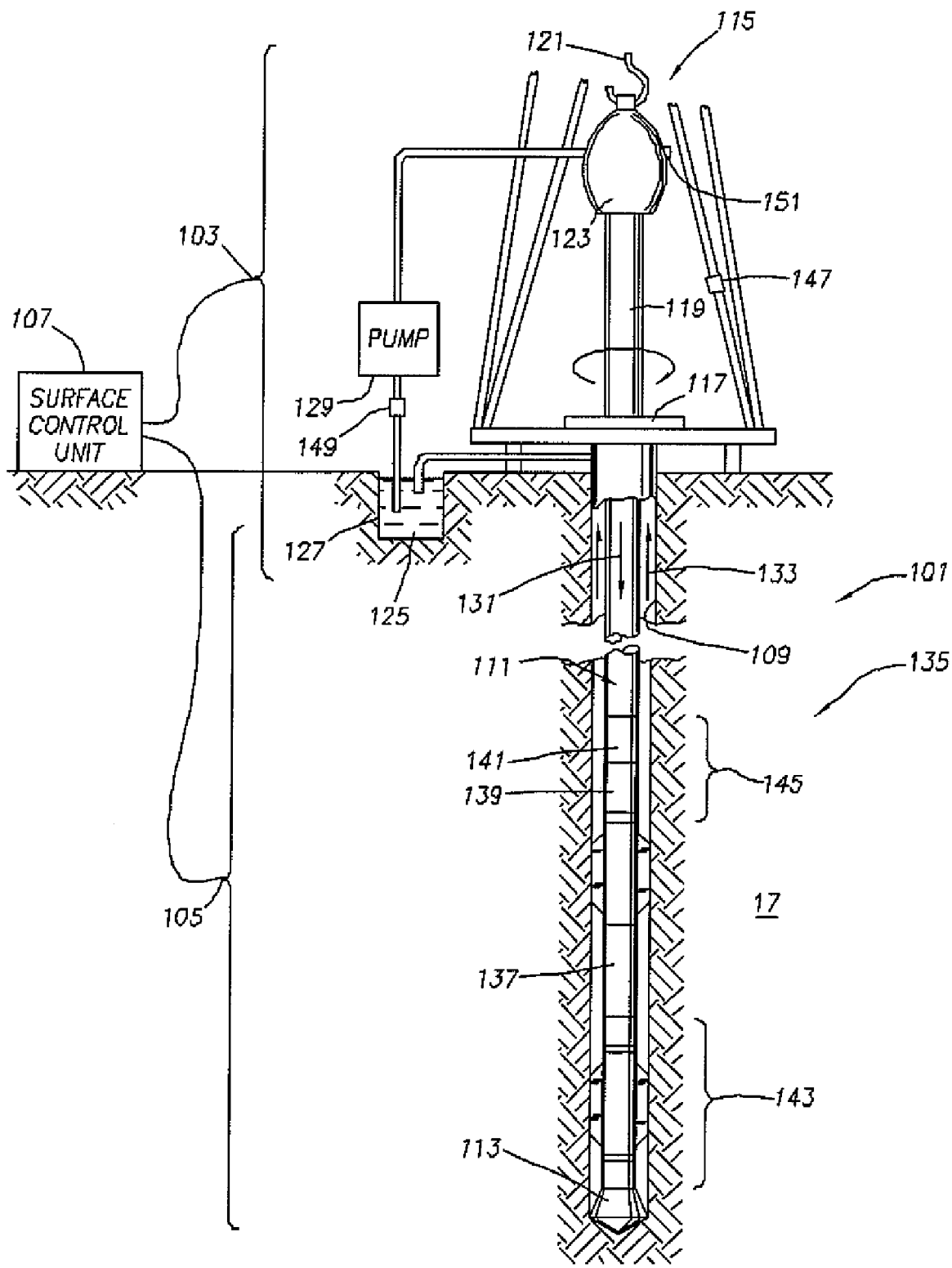

Refer now to FIGS. 20 and 21. These FIGS. 20 and 21 illustrate the ultimate purpose of the above referenced process for 'interactive automation of fault modeling' including the 'method for Intelligently Sensing fault-fault relationships' as illustrated in FIGS. 1 and 19; that is, to extract underground deposits of hydrocarbon including oil and/or gas from an Earth formation. FIG. 20 illustrates the characteristics of the Earth formation including a location in the formation where the oil and/or gas is located, and FIG. 21 illustrates a drilling rig that can be used for extracting the underground deposits of hydrocarbon including the oil and/or gas from that location in the Earth formation of FIG. 20.

In FIG. 20, a first horizon (H1) 140 and a second horizon (H2) 142 are intersected by the 'fault surface' 58. Now that the 'fault surface' 58 has been defined, it is necessary to interpret a well log output record and the reduced seismic data output record (shown in FIGS. 23 and 26) to define the precise location of the 'underground deposits of hydrocarbon' in an Earth formation. For example, in FIG. 20, the 'fault surface' 58 cuts through the first horizon 140 and the second horizon 142 in the Earth formation. A line 144 represents a separation between oil 146 and water 148, the oil 146 and water 148 existing on one side of the 'fault surface' 58. Rock and porous material exists on the other side of the 'fault surface' 58. The 'fault surface' 58 intersects the horizons (H1) 140 and (H2) 142 at two places, a first intersection 150 and a second intersection 152. From FIG. 20, it is evident that oil (and/or gas) 146 usually exists near the intersections 150 and 152 between the 'fault surface' 58 and the horizons (H1) 140 and (H2) 142. In order to extract the oil 146 from the Earth formation, it is necessary to drill near the first intersection 150 at point 154.

In FIG. 21, recalling from FIG. 20 that it would be necessary to drill near the first intersection 150 at point 154 in order to extract the oil 146 from the Earth formation, a drilling rig can be placed on the Earth's surface directly above the point 154 of FIG. 20 for the purpose of extracting the oil 146 from the Earth formation.

In FIG. 21, an example of that drilling rig 101 is illustrated. The drilling rig 101 is situated above a 'particular location' in the Earth formation (that is, above the point 154 in the Earth's formation of FIG. 20) where the oil and/or gas is potentially located. In FIG. 21, one embodiment of the drilling rig 101 includes a surface system 103, a downhole system 105, and a surface control unit 107. In the illustrated embodiment, a borehole 109 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs. The downhole system 105 includes a drill string 111 suspended within the borehole 109 with a drill bit 113 at its lower end. The surface system 103 includes the land-based platform and derrick assembly 115 positioned over the borehole 109 penetrating a subsurface formation 17. The assembly 115 includes a rotary table 117, kelly 119, hook 121, and rotary swivel 123. The drill string 111 is rotated by the rotary table 117, energized by means not shown, which engages the kelly 119 at the upper end of the drill string. The drill string 111 is suspended from a hook 121, attached to a traveling block (also not shown), through the kelly 119 and a rotary swivel 123 which permits rotation of the drill string relative to the hook. The surface system further includes drilling fluid or mud 125 stored in a pit 127 formed at the well site. A pump 129 delivers the drilling fluid 125 to the interior of the drill string 111 via a port in the swivel 123, inducing the drilling fluid to flow downwardly through the drill string 111 as indicated by the directional arrow 131. The drilling fluid exits the drill string 111 via ports in the drill bit 113, and then circulates upwardly through the region between the outside of the drill string and the wall of the borehole, called the annulus, as indicated by the directional arrows 133. In this manner, the drilling fluid lubricates the drill bit 113 and carries formation cuttings up to the surface as it is returned to the pit 127 for recirculation. The drill string 111 further includes a bottom hole assembly (BHA), generally referred to as 135, near the drill bit 113 (in other words, within several drill collar lengths from the drill bit). The bottom hole assembly includes capabilities for measuring, processing, and storing information, as well as communicating with the surface. The BHA 135 further includes drill collars 137, 139, and 141 for performing various other measurement functions. Drill collar 137 of BHA 135 includes an apparatus 143 for determining and communicating one or more properties of the formation 17 surrounding borehole 109, such as formation resistivity (or conductivity), natural radiation, density (gamma ray or neutron), and pore pressure. Drill collar 139 houses a measurement-while-drilling (MWD) tool. The MWD tool further includes an apparatus for generating electrical power to the downhole system. While a mud pulse system is depicted with a generator powered by the flow of the drilling fluid 125 that flows through the drill string 111 and the MWD drill collar 141, other power and/or battery systems may be employed. Sensors are located about the wellsite to collect data, preferably in real time, concerning the operation of the wellsite, as well as conditions at the wellsite. For example, monitors, such as cameras 147, may be provided to provide pictures of the operation. Surface sensors or gauges 149 are disposed about the surface systems to provide information about the surface unit, such as standpipe pressure, hookload, depth, surface torque, rotary rpm, among others. Downhole sensors or gauges 151 are disposed about the drilling tool and/or wellbore to provide information about downhole conditions, such as wellbore pressure, weight on bit, torque on bit, direction, inclination, collar rpm, tool temperature, annular temperature and toolface, among others. The information collected by the sensors and cameras is conveyed to the surface system, the downhole system and/or the surface control unit. The MWD tool 141 includes a communication subassembly 145 that communicates with the surface system. The communication subassembly 145 is adapted to send signals to and receive signals from the surface using mud pulse telemetry. The communication subassembly may include, for example, a transmitter that generates a signal, such as an acoustic or electromagnetic signal, which is representative of the measured drilling parameters. The generated signal is received at the surface by transducers, represented by reference numeral 151, that convert the received acoustical signals to electronic signals for further processing, storage, encryption and use according to conventional methods and systems. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

Figure 22:
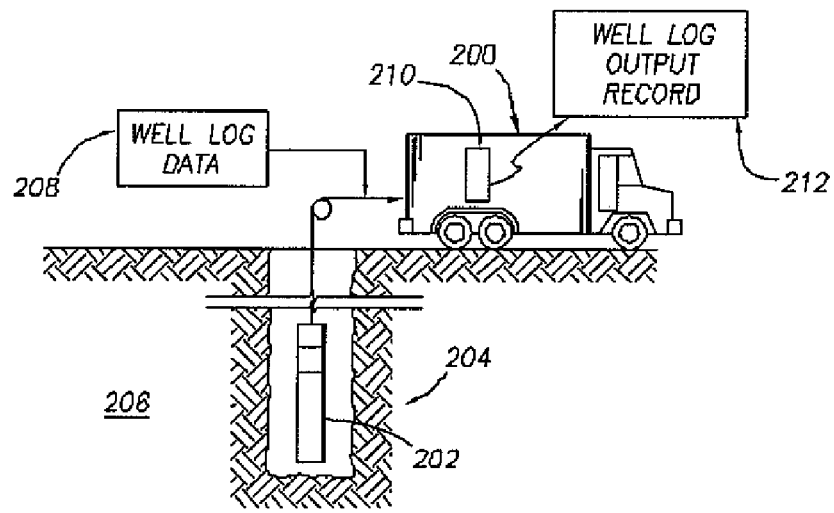
FIGS. 22 and 23 illustrate a method for generating a well log output record.
Figure 23:
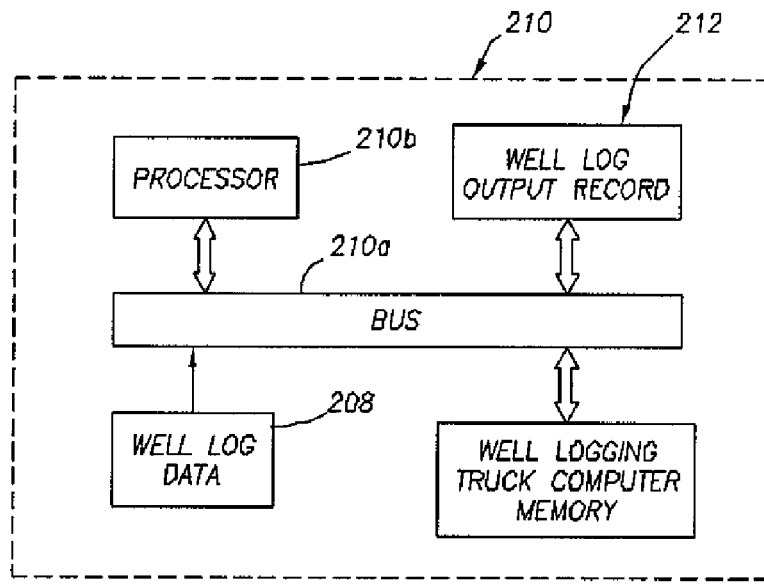
Figure 27:
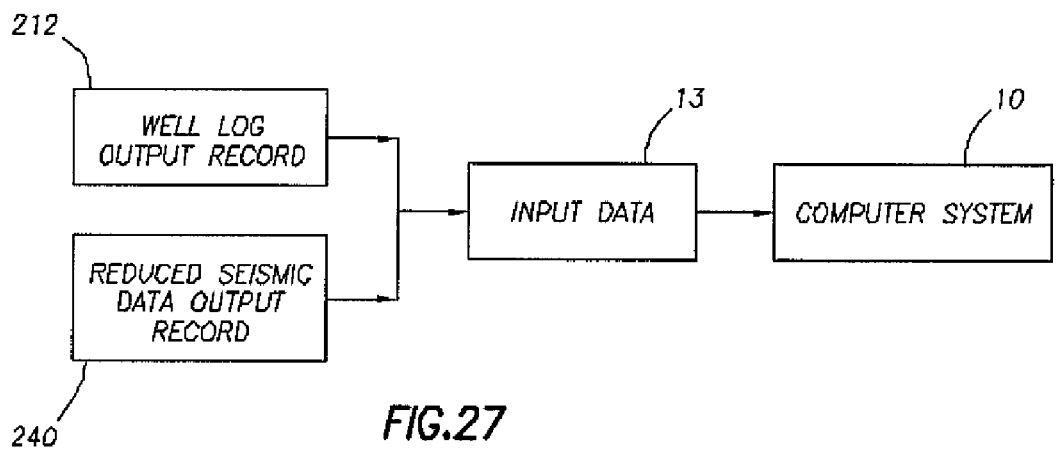
FIG. 27 illustrates how the well log output record of FIG. 23 and the reduced seismic data output record of FIG. 26 collectively, and in combination, represent the 'input data' 15 that is input to the computer system 10 of FIG. 1.
Figure 24:
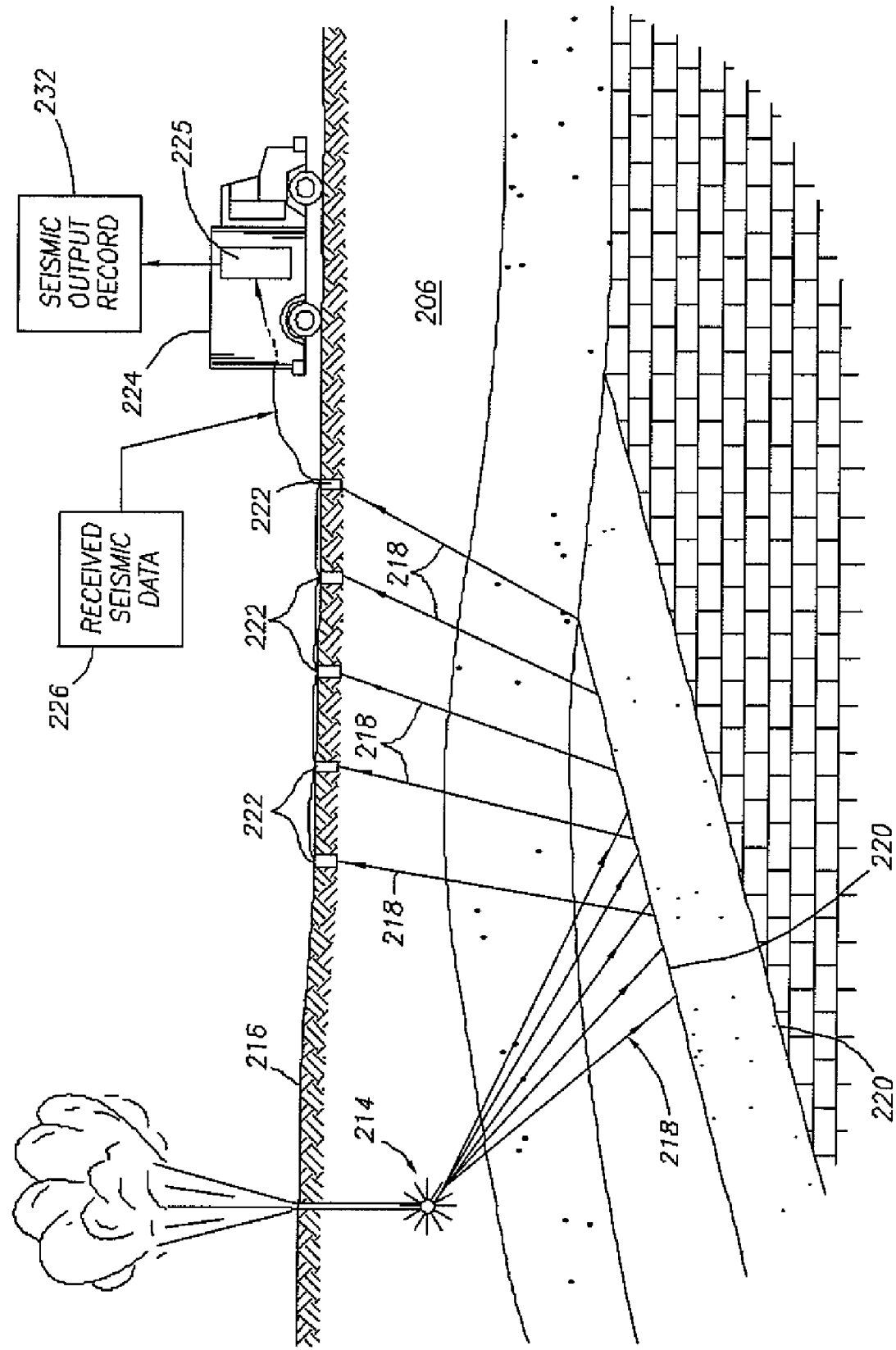
FIGS. 24, 25, and 26 illustrate a method for generating a reduced seismic data output record.
Figure 25:
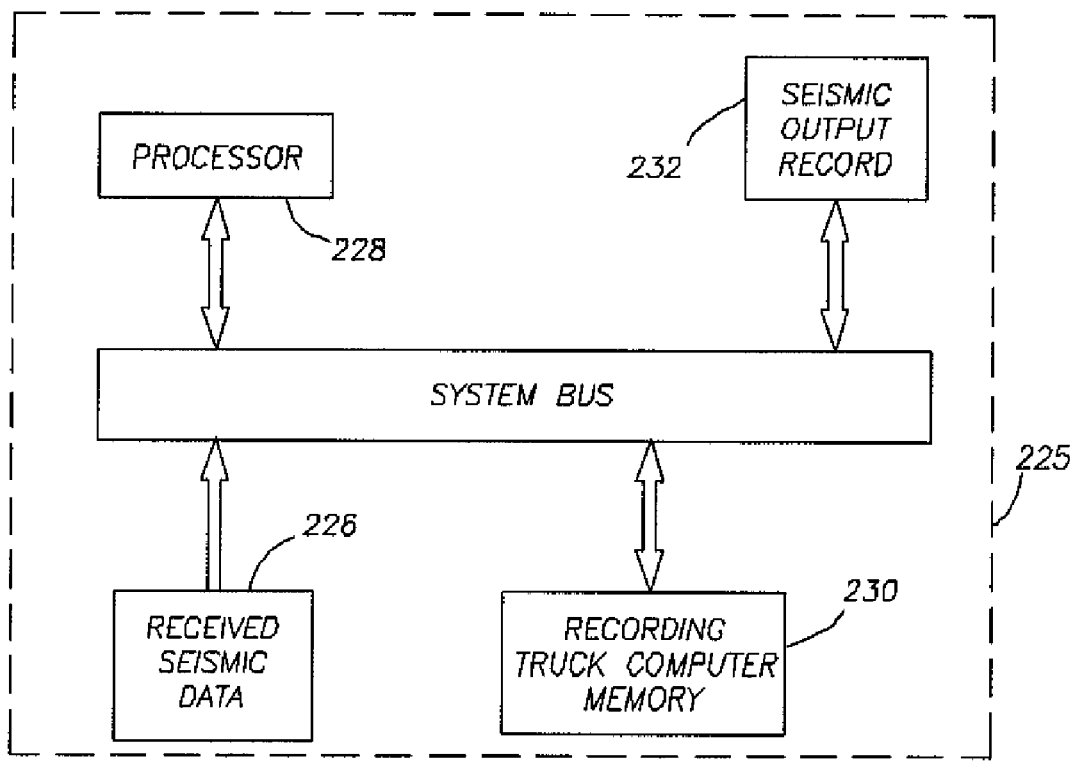
Figure 26:
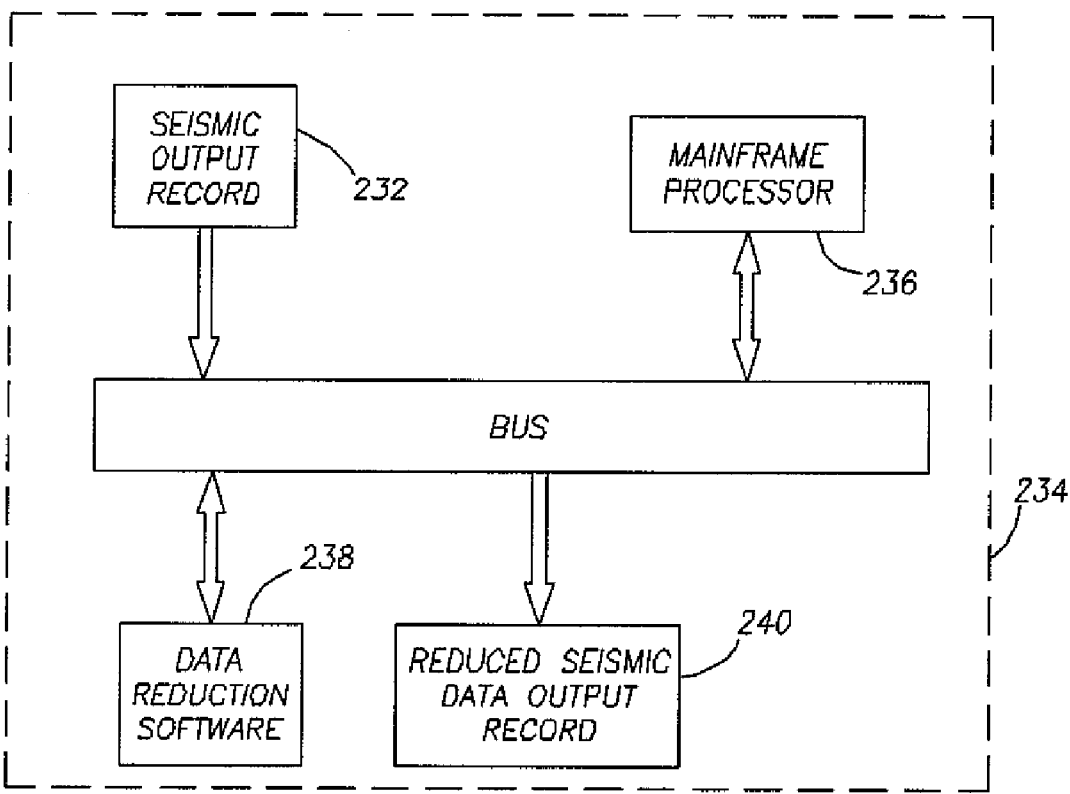

Refer now to FIGS. 22 through 27. Recall from FIG. 1 that 'input data' 13 is provided to the computer system 10 and that the processor 10a executes the 'software' stored in the memory 10c in response to that 'input data' 13. The details of the 'input data' 13 of FIG. 1 that is provided to the computer system 10 will be discussed below with reference to FIGS. 22 through 27 of the drawings. FIGS. 22 and 23 illustrate a method for generating a well log output record. FIGS. 24, 25, and 26 illustrate a method for generating a reduced seismic data output record. FIG. 27 illustrates how the well log output record and the reduced seismic data output record collectively and in combination represent the 'input data' 13 that is input to the computer system 10 of FIG. 1.

In FIG. 22, a well logging truck 200 lowers a logging tool 202 into the wellbore 204 and the logging tool 202 stimulates and energizes the Earth formation 206. In response, sensors in the logging tool 202 receive signals from the formation 206, and, in response thereto, other signals representative of well log data 208 propagate uphole from the logging tool 202 to a well logging truck computer 210. A well log output record 212 is generated by the well logging truck computer 210 which displays the well log data 208.

In FIG. 23, a more detailed construction of the well logging truck computer 210 is illustrated. A bus 210a receives the well log data 208 and, responsive thereto, the well log output record 212 is generated by the processor 210b, the well log output record 212 displaying and/or recording the well log data 208. The well log output record 212 is input to the interpretation workstation or computer system of FIG. 27.

In FIG. 24, an apparatus and associated method for performing a three dimensional (3D) seismic operation at a location on the earth's surface near the wellbore of FIG. 22 is illustrated.

In FIG. 24, an explosive or acoustic energy source 214 situated below the surface of the earth 216 detonates and generates a plurality of sound or acoustic vibrations 218 which propagate downwardly and reflect off a horizon layer 220 within the Earth formation 206. The horizon layer 220 could be a top layer of rock or sand or shale. When the sound vibrations reflect off the horizon layer 220, the sound vibrations 218 will propagate upwardly and will be received in a plurality of receivers 222 called geophones 222 situated at the surface of the earth. The plurality of geophones 222 will each generate an electrical signal in response to the receipt of a sound vibration therein and a plurality of electrical signals will be generated from the geophones 222, the plurality of signals (referred to as 'received seismic data 226') being received in a recording truck 224. The plurality of electrical signals from the geophones 222 (that is, the 'received seismic data' 226) represent a set of characteristics of the earth formation including the horizons 220 located within the earth below the geophones 222. The recording truck 224 contains a computer 225 which will receive and store the plurality of signals received from the geophones 222. A seismic output record 232 will be generated from the computer 225 in the recording truck 224 which will include and/or display and/or store the plurality of electrical signals that are representative of the characteristics of the earth formation including the horizons 220 located within the earth below the geophones 222.

In FIG. 25, a more detailed construction of the recording truck computer 225 is illustrated. The recording truck computer 225 of FIG. 24 includes a processor 228 and a memory 230 connected to a system bus. The electrical signals, received from the geophones 222 during the 3D seismic operation and referred to as the 'received seismic data' 226, would be received into the recording truck computer 225 via the "Received Seismic Data" block 226 in FIG. 25 and would be stored in the memory 230 of the recording truck computer 225. When desired, a seismic output record 232 is generated by the recording truck computer 225, the seismic output record 232 being adapted for recording and displaying "a plurality of seismic data" representing the 'received seismic data' traces or sets of electrical signals received by the recording truck computer 225 from the geophones 222.

In FIG. 26, a simplified diagram of a mainframe computer 234 is illustrated which uses a stored "data reduction software" to perform a "data reduction" operation on the "plurality of seismic data" included in the seismic output record 232 of FIG. 25. The mainframe computer 234 produces a "reduced seismic data output record" 240 in FIG. 26 which is adapted for recording and displaying information that represents "reduced" versions of the "plurality of seismic data" included in the seismic output record 232 of FIG. 26. The mainframe computer 234 of FIG. 26 includes a mainframe processor 236 connected to a system bus and a memory 238 also connected to the system bus which stores a "data reduction software" therein. The seismic output record 232 of FIG. 25, which includes the "plurality of seismic data", is connected to the system bus of the mainframe computer 234 of FIG. 26. As a result, the "plurality of seismic data", included in the seismic output record 232 of FIG. 26, is now being input to the mainframe processor 236 of FIG. 26. The processor 236 of the mainframe computer 234 in FIG. 26 executes the "data reduction software" stored in the memory 238 of the mainframe computer. The "data reduction software", which is stored in the memory 238 of the mainframe computer 234 of FIG. 26, can be found in a book entitled "Seismic Velocity Analysis and the Convolutional Model", by Enders A. Robinson, the disclosure of which is incorporated by reference into this specification. When the "data reduction software" in memory 238 is executed, the mainframe processor 236 will perform a "data reduction" operation on the "plurality of seismic data" that is included in the seismic output record 232 of FIG. 26. When the "data reduction operation" is complete, the mainframe processor 236 will generate a "reduced seismic data output record" 240 which will record and is adapted for displaying information representing a "reduced version" of the "plurality of seismic data" included in the seismic output record 232 of FIG. 26, and including a set of characteristics pertaining to the earth formation located near the wellbore of FIG. 22, the characteristics including the location and structure of the horizons 220 of FIG. 24.

In FIG. 27, the well log output record 212 of FIG. 23 and the reduced seismic data output record 240 of FIG. 26 collectively and in-combination represent the 'input data' 13 of FIG. 1 that is input to the computer system 10 of FIG. 1.

A functional description of the operation of the Fault Modeling software 12 of FIG. 1, when executed by the processor 10a of FIG. 1, which is adapted for practicing the 'interactive automation of fault modeling' process including the 'method for Intelligently Sensing fault-fault relationships', as shown in the first embodiment of FIGS. 2 and 3 and the second embodiment of FIGS. 4 and 5, will be set forth in the following paragraphs with reference to FIGS. 1 through 27 of the drawings.

In FIG. 1, the computer system 10 receives the input data 13. In FIG. 27, the input data 13 includes the well log output record 212 and the reduced seismic data output record 240. FIGS. 22 and 23 describe how the well log output record 212 is generated, and FIGS. 24-26 describe how the reduced seismic data output record 240 is generated. In FIG. 1, the processor 10a executes the Fault Modeling software 12 stored in the memory 10c, while utilizing the input data 13, and generates an 'output' which is recorded or displayed on the Recorder or Display device 10d. One example of the 'output', that is recorded or displayed on the Recorder or Display device 10d, is illustrated in FIG. 19. In FIG. 19, the 'output' can, for example, comprise a final model of two related faults, where one fault is modeled up to, and terminates at, the common intersection with another fault (see step 28 of FIG. 3 and step 31 of FIG. 5). In FIG. 1, the Fault Modeling software 12, which is stored in the memory 10c, will, when executed by the processor 10a, practice a process involving an 'interactive automation of fault modeling' which includes a 'method for Intelligently Sensing fault-fault relationships'. A first embodiment of the 'method for Intelligently Sensing fault-fault relationships' is illustrated in FIGS. 2 and 3, and a second embodiment of the 'method for Intelligently Sensing fault-fault relationships' is illustrated in FIGS. 4 and 5. The 'method for Intelligently Sensing fault-fault relationships' will provide a non-intrusive intelligent system for aiding or coaching or assisting an interpreter to set 'fault-fault relationships' at an early stage during the fault interpretation process. The 'method for Intelligently Sensing fault-fault relationships', which actually represents an 'auto-sensed relationship among faults' process, is useful when computers represent the preferred way for characterizing oil and gas reservoirs for the purpose of drilling wellbores and for other decisions which need to be made in connection with the exploitation of a reservoir during oil and/or gas exploration and production. Therefore, the 'method for Intelligently Sensing fault-fault relationships' represents an improvement to a method by which fault structures are modeled as an embedded part of a fault interpretation process. Therefore, the 'method for Intelligently Sensing fault-fault relationships' (which is practiced by processor 10a of FIG. 1 when the processor 10a executes the Fault Modeling software 12 stored in memory 10c) includes the following steps:

(step 1) automatically sensing 'interrelationships among faults' (for example, one 'interrelationship among faults' would be: how one fault should truncate another fault), and (step 2) presenting, to a user/operator, the 'interrelationships among faults' as an integral part of the interpretation process.

When the processor 10a completes its execution of (step 1) and (step 2) of the Fault Modeling software 12, the 'interactive automation of fault modeling' process, including the 'method for Intelligently Sensing fault-fault relationships', is complete. As a result, a 'final model' is generated, and one example of the 'final model' is illustrated in FIG. 19. The 'final model' represents an 'added value' to the fault interpretation process.

A first embodiment of the Fault Modeling software 12 is illustrated in FIGS. 2 and 3. When the processor 10a of FIG. 1 executes the first embodiment of the Fault Modeling software 12, the processor 10a is practicing a 'method for interactive automation of fault modeling' including a 'method for intelligently sensing fault-fault relationships', the 'method for intelligently sensing fault-fault relationships' including (step 1) and (step 2). However, (step 1) includes the following additional steps (1) through (6) as follows: (1) Computing models of each fault as if each fault were unrelated to any other fault, step 16 of FIG. 2, (2) Keeping un-related models of each fault up-to-date as new interpretation data are produced, step 18 of FIG. 2, (3) Detecting a condition whereby data associated with one fault (i.e., the fault being interpreted) indicates that the fault being interpreted is 'close to' one or more other faults, step 20 of FIG. 2 (see FIG. 15 for 'Fault Proximity Detection'), (4) Presenting, in a pop-up window, the one or more potentially related faults to the interpreter, the interpreter confirming or denying, in a response, that a connection relationship between the potentially related faults is valid, step 22 of FIG. 2, (5) Recording the response from the interpreter and, if the connection relationship is confirmed by the interpreter, computing all connection relationship properties, step 24 of FIG. 3, and (6) Adding intersection curve and other connection properties, representing new interpretations, to the fault which embeds the connection relationship in with the interpretation data, step 26 of FIG. 3. In addition, (step 2) includes the following additional step (7) as follows: (7) Optionally computing and displaying the final model to illustrate the faults as being connected, that is, as being intersected, step 28 of FIG. 3. The above referenced additional step (3), which is adapted for detecting a condition whereby data associated with one fault (i.e., the fault being interpreted) indicates that the fault being interpreted is 'close to' one or more other faults (step 20 of FIG. 2), actually includes another method, known as 'Fault Proximity Detection', which is illustrated in FIG. 15. In FIG. 15, in order to practice the additional step (3) and detect a condition whereby data associated with one fault (i.e., the fault being interpreted) indicates that the fault being interpreted is 'close to' (or is 'proximate to' or is 'in proximity to') one or more other faults, the processor 10a of FIG. 1 must now execute the steps of FIG. 15, as follows.

(1) In connection with each fault in the framework, except for the 'interpreted fault', step 33 of FIG. 15, (2) Should we ignore any relationship with this fault, step 35 in FIG. 15, (3) If yes, return to step 33, but, if no, access 'best-fit plane' fault model and its transform, step 37 of FIG. 15, (4) Get the 'fault-fault connection distance', step 39 of FIG. 15, (5) For each new interpretation point 'P', step 41 of FIG. 15, (6) Transform 'P' to 'best-fit plane' coordinate space', step 43 of FIG. 15, (7) Project 'P' onto the fault as point P' (i.e., point P prime), step 45 of FIG. 15, (8) Is point P' (i.e., point P prime) on real part of fault?, step 47 of FIG. 15, (9) Is the P to P' distance<D? (i.e., is the P to P prime distance less than D?), step 49 of FIG. 15, (10) If no, return to step 41, but, if yes, mark the fault as 'proximate to' (or 'close to' or 'in close proximity to') the interpretation fault, step 51 of FIG. 15. After executing the steps of FIG. 15, if it has been determined that the 'one fault' (i.e., the fault being interpreted) is 'close to' (or is 'proximate to' or is 'in proximity to') 'one or more other faults', it is now necessary to compute and determine the 'fault-fault intersection curve' between the 'one fault' and the 'one or more other faults'. In order to compute and determine the 'fault-fault intersection curve' between the 'one fault' and the 'one or more other faults', the processor 10a of FIG. 1 must now execute the steps of FIG. 18, as follows: (1) Access interpreted fault model, Fa, and its transform, step 53 in FIG. 18, (2) Access intellisensed fault model, Fb, and its transform, step 55 of FIG. 18, (3) Compute (Fa–Fb) intersection curve throughout common model VOI (real and imaginary), step 57 of FIG. 18, (4) Get fault-fault connection distance, D, step 59 of FIG. 18, (5) Compute tip loop extrapolated D beyond Fa data, using selected tip loop style (isotropic and anisotropic), step 61 of FIG. 18, and (6) Reset intersection curve to real valued inside tip loop, step 63 in FIG. 18.

A second embodiment of the Fault Modeling software 12 is illustrated in FIGS. 4 and 5. When the processor 10a of FIG. 1 executes the second embodiment of the Fault Modeling software 12, the processor 10a is practicing a 'method for interactive automation of fault modeling' including a 'method for intelligently sensing fault-fault relationships', the 'method for intelligently sensing fault-fault relationships' including (step 1) and (step 2). However, (step 1) includes the following additional steps (1) through (7) as follows: (1) Computing models of each fault as if each fault were unrelated to any other fault, step 17 of FIG. 4, (2) Keeping un-related models of each fault up-to-date as new interpretation data are produced, step 19 of FIG. 4, (3) Detecting a condition whereby data associated with one fault (i.e., the fault being interpreted) indicates that the fault being interpreted is 'close to' one or more other faults, step 21 of FIG. 4 (see FIG. 15 of 'Fault Proximity Detection'), (4) Computing connection relationship properties between the interpreted fault and the one or more other faults, including: fault-fault intersection curve and truncation rule, step 23 of FIG. 4, (5) Presenting the intersection curve of the one or more potentially related faults to the interpreter, the interpreter confirming or denying, in a response, that a connection relationship between the potentially related faults is valid, step 25 of FIG. 5, (6) Recording the response from the interpreter and, if the connection relationship is confirmed by the interpreter, computing remaining connection relationship properties, step 27 of FIG. 5, and (7) Adding the intersection curve and other connection properties, representing new interpretations, to the fault which embeds the connection relationship in with the interpretation data, step 29 of FIG. 5. In addition, (step 2) includes the following additional step (8) as follows: (8) Optionally computing and displaying the final model to illustrate the faults as being connected, that is, as being intersected, step 31 of FIG. 5. The above referenced additional step (3), which is adapted for detecting a condition whereby data associated with one fault (i.e., the fault being interpreted) indicates that the fault being interpreted is 'close to' one or more other faults (step 20 of FIG. 2), actually includes another method, known as 'Fault Proximity Detection', which is illustrated in FIG. 15. In FIG. 15, in order to practice the additional step (3) and detect a condition whereby data associated with one fault (i.e., the fault being interpreted) indicates that the fault being interpreted is 'close to' (or is 'proximate to' or is 'in proximity to') one or more other faults, the processor 10a of FIG. 1 must now execute the steps of FIG. 15, as follows: (1) In connection with each fault in the framework, except for the 'interpreted fault', step 33 of FIG. 15, (2) Should we ignore any relationship with this fault, step 35 in FIG. 15, (3) If yes, return to step 33, but, if no, access 'best-fit plane' fault model and its transform, step 37 of FIG. 15, (4) Get the 'fault-fault connection distance', step 39 of FIG. 15, (5) For each new interpretation point 'P', step 41 of FIG. 15, (6) Transform 'P' to 'best-fit plane' coordinate space', step 43 of FIG. 15, (7) Project 'P' onto the fault as point P' (i.e., point P prime), step 45 of FIG. 15, (8) Is point P' (i.e., point P prime) on real part of fault?, step 47 of FIG. 15, (9) Is the P to P' distance<D? (i.e., is the P to P prime distance less than D?), step 49 of FIG. 15, (10) If no, return to step 41, but, if yes, mark the fault as 'proximate to' (or 'close to' or 'in close proximity to') the interpretation fault, step 51 of FIG. 15. After executing the steps of FIG. 15, if it has been determined that the 'one fault' (i.e., the fault being interpreted) is 'close to' (or is 'proximate to' or is 'in proximity to') 'one or more other faults', it is now necessary to compute and determine the 'fault-fault intersection curve' between the 'one fault' and the 'one or more other faults'. In order to compute and determine the 'fault-fault intersection curve' between the 'one fault' and the 'one or more other faults', the processor 10a of FIG. 1 must now execute the steps of FIG. 18, as follows: (1) Access interpreted fault model, Fa, and its transform, step 53 in FIG. 18, (2) Access intellisensed fault model, Fb, and its transform, step 55 of FIG. 18, (3) Compute (Fa–Fb) intersection curve throughout common model VOI (real and imaginary), step 57 of FIG. 18, (4) Get fault-fault connection distance, D, step 59 of FIG. 18, (5) Compute tip loop extrapolated D beyond Fa data, using selected tip loop style (isotropic and anisotropic), step 61 of FIG. 18, and (6) Reset intersection curve to real valued inside tip loop, step 63 in FIG. 18.

In FIGS. 19, 20, and 21, when the 'final model' is generated (and recall that one example of the 'final model' is illustrated in FIG. 19), the location of the horizons 140, 142 and the fault surface 58, as shown in FIG. 20, are known. In particular, the location of the oil and/or gas at point or location 154 between the horizon 140 and the fault surface 58 of FIG. 20 may be known. When the location of the oil and/or gas at point or location 154 of FIG. 20 is known, the drilling rig 110 as shown in FIG. 21 may be used to extract the oil and/or gas from the point or location 154 of FIG. 20.

The above description of the 'Fault Modeling Software' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A method for interactive automation of fault modeling, comprising:

sensing a fault-fault relationship between a pair of faults, wherein the sensing step comprises:

computing models of each fault of a plurality of faults as if each were unrelated to any other fault of the plurality of faults;

keeping unrelated models of said each fault up-to-date as new interpretation data is produced; and detecting a condition where data indicates that a fault of the plurality of faults being interpreted is in close proximity to one or more other faults of the plurality of faults thereby identifying one or more potentially related faults, wherein the step of detecting the condition where data indicates that the fault being interpreted is in close proximity to the one or more other faults comprises:

in connection with said one or more other faults in a framework not including the fault being interpreted, determining whether a relationship should be ignored between said interpreted fault and each fault among said one or more faults;

on the condition that said relationship should not be ignored, access a best-fit plane fault model and its transform, obtain a fault-fault connection distance, for each new interpretation point 'P', transform 'P' to a best-fit plane coordinate space, validate that 'P' projects onto a real part of said each fault, project 'P' onto said each fault as point 'P prime', determine whether 'P prime' is on a real part of the fault, determine whether a 'P' to 'P prime' distance is less than the fault-fault connection distance, and on the condition that 'P prime' is on the real part of the fault and the 'P' to 'P prime' distance is less than the fault-fault connection distance, mark said each fault as being in close proximity to the fault being interpreted; and displaying a final model which includes the pair of faults, the final model illustrating the pair of faults as being interconnected.

2. The method of claim 1, wherein the sensing step comprises:

presenting, in a pop-up window or flashing on a display a fault-fault intersection curve, the one or more potentially related faults to an interpreter, the interpreter confirming or denying in a response that a connection relationship between the potentially related faults is valid.

3. The method of claim 2, wherein the sensing step comprises:

recording the response and, if the connection relationship is confirmed by the interpreter, computing all remaining connection relationship properties heretofore un-computed.

4. The method of claim 3, wherein the sensing step comprises:

adding intersection type properties as new interpretations to the fault being interpreted thereby embedding a connection relationship in with a set of interpretation data.

5. The method of claim 4, wherein the sensing step comprises:

computing said final model which includes the pair of faults, the final model illustrating the pair of faults as being interconnected, the computing step including keeping intersecting fault models up-to-date as new interpretation data is produced by computing a final model of each fault and computing a final intersection curve along which one fault of the plurality of faults intersects another fault of the plurality of faults and where the one fault is terminated or truncated by said another fault.

6. The method of claim 5 wherein the step of computing said final model which includes the pair of faults comprises:

keeping an entire framework of faults up-to-date where some faults of the framework are independent and some faults of the framework are nonintersecting and some faults of the framework are intersecting.

7. The method of claim 1 wherein the step of keeping unrelated models of each fault up-to-date as new interpretation data is produced comprises:

keeping an entire framework of faults up-to-date where some faults of the framework are independent and some faults of the framework are nonintersecting.

8. A program storage device readable by a machine tangibly embodying a program of instructions executable by the machine to perform method steps for interactive automation of fault modeling, the method steps comprising:

sensing a fault-fault relationship between a pair of faults, wherein the sensing step comprises:

computing models of each fault of a plurality of faults as if each were unrelated to any other fault of the plurality of faults;

keeping unrelated models of said each fault up-to-date as new interpretation data is produced; and detecting a condition where data indicates that a fault of the plurality of faults being interpreted is in close proximity to one or more other faults of the plurality of faults thereby identifying one or more potentially related faults, wherein the step of detecting the condition where data indicates that the fault being interpreted is in close proximity to the one or more other faults comprises:

in connection with said one or more other faults in a framework not including the fault being interpreted, determining whether a relationship should be ignored between said interpreted fault and each fault among said one or more faults;

on the condition that said relationship should not be ignored, access a best-fit plane fault model and its transform, obtain a fault-fault connection distance, for each new interpretation point 'P', transform 'P' to a best-fit plane coordinate space, validate that 'P' projects onto a real part of said each fault, project 'P' onto said each fault as point 'P prime', determine whether 'P prime' is on a real part of the fault, determine whether a 'P' to 'P prime' distance is less than the fault-fault connection distance, and on the condition that 'P prime' is on the real part of the fault and the 'P' to 'P prime' distance is less than the fault-fault connection distance, mark said each fault as being in close proximity to the fault being interpreted; and displaying a final model which includes the pair of faults, the final model illustrating the pair of faults as being interconnected.

9. The program storage device of claim 8, wherein the sensing step comprises:

presenting, in a pop-up window or flashing on a display a fault-fault intersection curve, the one or more potentially related faults to an interpreter, the interpreter confirming or denying in a response that a connection relationship between the potentially related faults is valid.

10. The program storage device of claim 9, wherein the sensing step comprises:

recording the response and, if the connection relationship is confirmed by the interpreter, computing connection relationship properties.

11. The program storage device of claim 10, wherein the sensing step comprises:

adding intersection type properties as new interpretations to the fault being interpreted thereby embedding a connection relationship in with a set of interpretation data.

12. The program storage device of claim 11, wherein the sensing step comprises:

computing said final model which includes the pair of faults, the final model illustrating the pair of faults as being interconnected, the computing step including keeping intersecting fault models up-to-date as new interpretation data is produced by computing a final model of each fault and computing a final intersection curve along which one fault of the plurality of faults intersects another fault of the plurality of faults and where the one fault is terminated or truncated by said another fault.

13. The program storage device of claim 12, wherein the step of computing said final model which includes the pair of faults comprises:

keeping an entire framework of faults up-to-date where some faults of the framework are independent and some faults of the framework are nonintersecting and some faults of the framework are intersecting.

14. The program storage device of claim 8, wherein the step of keeping unrelated models of each fault up-to-date as new interpretation data is produced comprises:

keeping an entire framework of faults up-to-date where some faults of the framework are independent and some faults of the framework are nonintersecting.

15. A computer readable medium storing instructions for conducting a process for interactive automation of fault modeling, said instructions when executed causing a processor to:

sense a fault-fault relationship between a pair of faults, wherein the sensing step comprises:

computing models of each fault of a plurality of faults as if each were unrelated to any other fault of the plurality of faults;

keeping unrelated models of said each fault up-to-date as new interpretation data is produced; and detecting a condition where data indicates that a fault of the plurality of faults being interpreted is in close proximity to one or more other faults of the plurality of faults thereby identifying one or more potentially related faults, wherein the step of detecting the condition where data indicates that the fault being interpreted is in close proximity to the one or more other faults comprises:

in connection with said one or more other faults in a framework not including the fault being interpreted, determining whether a relationship should be ignored between said interpreted fault and each fault among said one or more faults;

on the condition that said relationship should not be ignored, access a best-fit plane fault model and its transform, obtain a fault-fault connection distance, for each new interpretation point 'P', transform 'P' to a best-fit plane coordinate space, validate that 'P' projects onto a real part of said each fault, project 'P' onto said each fault as point 'P prime', determine whether 'P prime' is on a real part of the fault, determine whether a 'P' to 'P prime' distance is less than the fault-fault connection distance, and on the condition that 'P prime' is on the real part of the fault and the 'P' to 'P prime' distance is less than the fault-fault connection distance, mark said each fault as being in close proximity to the fault being interpreted; and display a final model which includes the pair of faults, the final model illustrating the pair of faults as being interconnected.

16. The computer readable medium of claim 15, wherein the sensing step comprises:

presenting, in a pop-up window or flashing on a display a fault-fault intersection curve, the one or more potentially related faults to an interpreter, the interpreter confirming or denying in a response that a connection relationship between the potentially related faults is valid.

17. The computer readable medium of claim 16, wherein the sensing step comprises:

recording the response and, if the connection relationship is confirmed by the interpreter, computing all remaining connection relationship properties heretofore un-computed.

18. The computer readable medium of claim 17, wherein the sensing step comprises:

adding intersection type properties as new interpretations to the fault being interpreted thereby embedding a connection relationship in with a set of interpretation data.

19. The computer readable medium of claim 18, wherein the sensing step comprises:

computing said final model which includes the pair of faults, the final model illustrating the pair of faults as being interconnected, the computing step including keeping intersecting fault models up-to-date as new interpretation data is produced by computing a final model of each fault and computing a final intersection curve along which one fault of the plurality of faults intersects another fault of the plurality of faults and where the one fault is terminated or truncated by said another fault.

20. The computer readable medium of claim 19 wherein the step of computing said final model which includes the pair of faults comprises:

keeping an entire framework of faults up-to-date where some faults of the framework are independent and some faults of the framework are nonintersecting and some faults of the framework are intersecting.

21. The computer readable medium of claim 15, wherein the step of keeping unrelated models of each fault up-to-date as new interpretation data is produced comprises:

keeping an entire framework of faults up-to-date where some faults of the framework are independent and some faults of the framework are nonintersecting.

22. A method for intelligently sensing fault-fault relationships as part of a fault interpretation process, said method comprising:

computing models of one or more faults as if each fault were unrelated to any other fault of the one or more faults;

detecting a condition wherein data associated with one fault of the one or more faults being interpreted indicates that the fault is in close proximity to one or more other faults, the one fault and the one or more other faults being potentially related faults, wherein the step of detecting the condition where data associated with the one fault being interpreted indicates that the fault is in close proximity to the one or more other faults comprises:

in connection with said one or more faults in a framework not including the fault being interpreted, determining whether a relationship should be ignored between said interpreted fault and each fault among said one or more faults;

on the condition that said relationship should not be ignored, access a best-fit plane fault model and its transform, obtain a fault-fault connection distance, for each new interpretation point 'P', transform 'P' to a best-fit plane coordinate space, validate that 'P' projects onto a real part of said each fault, project 'P' onto said each fault as point 'P prime', determine whether 'P prime' is on a real part of the fault, and determine whether a 'P' to 'P prime' distance is less than the fault-fault connection distance, on the condition that 'P prime' is on the real part of the fault and the 'P' to 'P prime' distance is less than the fault-fault connection distance, mark said each fault as being in close proximity to the fault being interpreted;

presenting the one or more potentially related faults to an interpreter, the interpreter confirming or denying that a connection relationship exists between the potentially related faults; and computing a connection relationship between the potentially related faults thereby generating a final model on the condition that the interpreter confirms that the connection relationship exists between the potentially related faults.

23. The method of claim 22, wherein the step of computing models of one or more faults as if each fault were unrelated to any other fault, comprises:

computing models of one or more faults as if each fault were unrelated to any other fault; and keeping unrelated models of each fault up-to-date as new interpretation data is produced.

24. The method of claim 23, further comprising:

computing and displaying the final model to illustrate the faults of said final model as being connected.

25. A program storage device readable by a machine tangibly embodying a program of instructions executable by the machine to perform method steps for intelligently sensing fault-fault relationships as part of a fault interpretation process, the method steps comprising:

computing models of one or more faults as if each fault were unrelated to any other fault of the one or more faults;

detecting a condition wherein data associated with one fault of the one or more faults being interpreted indicates that the fault is in close proximity to one or more other faults, the one fault and the one or more other faults being potentially related faults, wherein the step of detecting the condition where data associated with the one fault being interpreted indicates that the fault is in close proximity to the one or more other faults comprises:

in connection with said one or more faults in a framework not including the fault being interpreted, determining whether a relationship should be ignored between said interpreted fault and each fault among said one or more faults;

on the condition that said relationship should not be ignored, access a best-fit plane fault model and its transform, obtain a fault-fault connection distance, for each new interpretation point 'P', transform 'P' to a best-fit plane coordinate space, validate that 'P' projects onto a real part of said each fault, project 'P' onto said each fault as point 'P prime', determine whether 'P prime' is on a real part of the fault, determine whether a 'P' to 'P prime' distance is less than the fault-fault connection distance, and on the condition that 'P prime' is on the real part of the fault and the 'P' to 'P prime' distance is less than the fault-fault connection distance, mark said each fault as being in close proximity to the fault being interpreted;

presenting the one or more potentially related faults to an interpreter, the interpreter confirming or denying that a connection relationship exists between the potentially related faults; and computing a connection relationship between the potentially related faults thereby generating a final model on the condition that the interpreter confirms that the connection relationship exists between the potentially related faults.

26. The program storage device of claim 25, wherein the step of computing models of one or more faults as if each fault were unrelated to any other fault, comprises:

computing models of one or more faults as if each fault were unrelated to any other fault; and keeping unrelated models of each fault up-to-date as new interpretation data is produced.

27. The program storage device of claim 26, further comprising:

computing and displaying the final model to illustrate the faults of said final model as being connected.

28. A computer readable medium storing instructions for conducting a method for intelligently sensing fault-fault relationships as part of a fault interpretation process, said instructions when executed causing a processor to:

compute models of one or more faults as if each fault were unrelated to any other fault of the one or more faults;

detect a condition wherein data associated with one fault of the one or more faults being interpreted indicates that the fault is in close proximity to one or more other faults, the one fault and the one or more other faults being potentially related faults, wherein the step of detecting the condition where data associated with the one fault being interpreted indicates that the fault is in close proximity to the one or more other faults comprises:

in connection with said one or more faults in a framework not including the fault being interpreted, determining whether a relationship should be ignored between said interpreted fault and each fault among said one or more faults;

on the condition that said relationship should not be ignored, access a best-fit plane fault model and its transform, obtain a fault-fault connection distance, for each new interpretation point 'P', transform 'P' to a best-fit plane coordinate space, validate that 'P' projects onto a real part of said each fault, project 'P' onto said each fault as point 'P prime', determine whether 'P prime' is on a real part of the fault, determine whether a 'P' to 'P prime' distance is less than the fault-fault connection distance, and on the condition that 'P prime' is on the real part of the fault and the 'P' to 'P prime' distance is less than the fault-fault connection distance, mark said each fault as being in close proximity to the fault being interpreted;

present the one or more potentially related faults to an interpreter, the interpreter confirming or denying that a connection relationship exists between the potentially related faults; and compute a connection relationship between the potentially related faults thereby generating a final model on the condition that the interpreter confirms that the connection relationship exists between the potentially related faults.

29. The computer readable medium of claim 28, wherein the step of computing models of one or more faults as if each fault were unrelated to any other fault, comprises:

computing models of one or more faults as if each fault were unrelated to any other fault; and keeping unrelated models of each fault up-to-date as new interpretation data is produced.

30. The computer readable medium of claim 29, the instructions further causing the processor to comprising:
compute and displaying the final model to illustrate the faults of said final model as being connected.

31. A system adapted for intelligently sensing fault-fault relationships as part of a fault interpretation process, said system comprising:
a memory; and
a processor operatively connected to the memory and having functionality to execute instructions for:
computing models of one or more faults as if each fault were unrelated to any other fault of the one or more faults;
detecting a condition wherein data associated with one fault of the one or more faults being interpreted indicates that the fault is in close proximity to one or more other faults, the one fault and the one or more other faults being potentially related faults, wherein the step of detecting the condition where data associated with the one fault being interpreted indicates that the fault is in close proximity to the one or more other faults comprises:
in connection with said one or more faults in a framework not including the fault being interpreted, determining whether a relationship should be ignored between said interpreted fault and each fault among said one or more faults;
on the condition that said relationship should not be ignored, accessing a best-fit plane fault model and its transform,
obtaining a fault-fault connection distance,
for each new interpretation point 'P', transforming 'P' to a best-fit plane coordinate space,
validating that 'P' projects onto a real part of said each fault,
projecting 'P' onto said each fault as point 'P prime',
determining whether 'P prime' is on a real part of the fault,
determining whether a 'P' to 'P prime' distance is less than the fault-fault connection distance, and
on the condition that 'P prime' is on the real part of the fault and the 'P' to 'P prime' distance is less than the fault-fault connection distance, marking said each fault as being in close proximity to the fault being interpreted;
presenting the one or more potentially related faults to an interpreter, the interpreter confirming or denying that a connection relationship exists between the potentially related faults; and
computing a connection relationship between the potentially related faults thereby generating a final model on the condition that the interpreter confirms that the connection relationship exists between the potentially related faults.

32. The system of claim 31, wherein computing models of one or more faults as if each fault were unrelated to any other fault, comprises:
apparatus adapted for computing models of one or more faults as if each fault were unrelated to any other fault; and
apparatus adapted for keeping unrelated models of each fault up-to-date as new interpretation data is produced.

33. The system of claim 32, the instructions further for:
computing and displaying the final model to illustrate the faults of said final model as being connected.

34. A system adapted for interactive automation of fault modeling, comprising:
a memory; and
a processor operatively connected to the memory and having functionality to execute instructions for:
sensing a fault-fault relationship between a pair of faults, wherein the sensing step comprises:
computing models of each fault of a plurality of faults as if each were unrelated to any other fault of the plurality of faults;
keeping unrelated models of said each fault up-to-date as new interpretation data is produced; and
detecting a condition where data indicates that a fault of the plurality of faults being interpreted is in close proximity to one or more other faults of the plurality of faults thereby identifying one or more potentially related faults, wherein the step of detecting the condition where data indicates that the fault being interpreted is in close proximity to the one or more other faults comprises:
in connection with said one or more other faults in a framework not including the fault being interpreted, determining whether a relationship should be ignored between said interpreted fault and each fault among said one or more faults;
on the condition that said relationship should not be ignored, access a best-fit plane fault model and its transform,
obtain a fault-fault connection distance,
for each new interpretation point 'P', transform 'P' to a best-fit plane coordinate space,
validate that 'P' projects onto a real part of said each fault,
project 'P' onto said each fault as point 'P prime',
determine whether 'P prime' is on a real part of the fault,
determine whether a 'P' to 'P prime' distance is less than the fault-fault connection distance, and
on the condition that 'P prime' is on the real part of the fault and the 'P' to 'P prime' distance is less than the fault-fault connection distance, mark said each fault as being in close proximity to the fault being interpreted; and
displaying a final model which includes the pair of faults, the final model illustrating the pair of faults as being interconnected.

35. A method for sensing fault-fault relationships, comprising:
automatically sensing interrelationships among faults, wherein the sensing step comprises:
computing models of each fault of a plurality of faults as if each fault were unrelated to any other fault of the plurality of faults;
keeping un-related models of said each fault up-to-date as new interpretation data is produced,
detecting a condition wherein data associated with a fault of the plurality of faults being interpreted indicates that the fault being interpreted is in close proximity to one or more other faults of the plurality of faults, said fault being in close proximity to said one or more faults on the condition that a 'P' to 'P prime' distance is less than D, wherein 'P' is an interpretation point, 'P prime' is the interpretation point projected onto each of said one or more other faults, and D is a fault-fault connection distance, and
computing a fault-fault intersection curve, and presenting a final model including the fault-fault intersection curve and one fault truncated at the curve to an interpreter representing the interrelationships among faults.

36. The method of claim 35, further comprising:
presenting, in a pop-up window, the one or more potentially related faults to the interpreter, the interpreter confirming or denying, in a response, that a connection relationship between the potentially related faults is valid.

37. The method of claim 36, further comprising:
recording the response from the interpreter and, if the connection relationship is confirmed by the interpreter, computing all connection relationship properties; and
adding intersection curve and other connection properties, representing new interpretations, to the fault which embeds the connection properties in with a set of interpretation data.

38. The method of claim 37, further comprising:
computing and displaying the final model to illustrate the faults as being connected or intersected.

39. The method of claim 35, further comprising:
computing connection relationship properties between the interpreted fault and the one or more other faults including the fault-fault intersection curve and a truncation rule; and
presenting the intersection curve of the one or more potentially related faults to the interpreter, the interpreter confirming or denying, in a response, that a connection relationship between the potentially related faults is valid.

40. The method of claim 39, further comprising:
recording the response from the interpreter and, if the connection relationship is confirmed by the interpreter, computing remaining connection relationship properties; and
adding an intersection curve and other connection properties, representing new interpretations, to the fault which embeds the connection relationship in with a set of interpretation data.

41. The method of claim 40, further comprising:
computing and displaying the final model to illustrate the faults as being connected or intersected.

42. The method of claim 35, wherein the step of detecting a condition whereby data associated with a fault being interpreted indicates that the fault being interpreted is in close proximity to one or more other faults comprises:
in connection with said one or more faults in a framework not including the fault being interpreted, determining if a relationship should be ignored between said interpreted fault and each fault among said one or more faults;
on the condition that said relationship should not be ignored, access a best-fit plane fault model and its transform,
obtain the fault-fault connection distance,
for each new interpretation point 'P', transform 'P' to a best-fit plane coordinate space,
project 'P' onto said each fault as point 'P prime',
determine if 'P prime' is on real part of fault,
determine if a 'P' to 'P prime' distance is less than D,
on the condition that 'P prime' is on real part of fault and the 'P' to 'P prime' distance is less than D, mark said each fault as being in close proximity to the fault being interpreted.

43. The method of claim 35, wherein the step of computing said fault-fault intersection curve comprises:
accessing an interpreted fault model, Fa, and its transform,
accessing an intellisensed fault model, Fb, and its transform,
computing an (Fa–Fb) intersection curve throughout a common model in a volume of interest,
obtaining the fault-fault connection distance D,
computing a tip loop extrapolated D beyond the Fa data using a selected tip loop style, and
resetting an intersection curve to real valued inside the tip loop.

44. A computer readable medium storing instructions for conducting a process for sensing fault-fault relationships, said instructions when executed causing a processor to perform:
automatically sensing interrelationships among a plurality of faults, wherein the sensing step comprises:
computing models of each fault of the plurality of faults as if each fault were unrelated to any other fault of the plurality of faults;
keeping un-related models of said each fault up-to-date as new interpretation data is produced,
detecting a condition wherein data associated with a fault being interpreted indicates that the fault of the plurality of faults being interpreted is in close proximity to one or more other faults of the plurality of faults, said fault being in close proximity to said one or more faults on the condition that a 'P' to 'P prime' distance is less than D, wherein 'P' is an interpretation point, 'P prime' is the interpretation point projected onto each of said one or more other faults, and D is a fault-fault connection distance, and
computing a fault-fault intersection curve, and
presenting a final model including the fault-fault intersection curve and one fault truncated at the curve to an interpreter representing the interrelationships among the plurality of faults.

45. The computer readable medium program of claim 44, the instructions further causing the processor to perform:
presenting, in a pop-up window, the one or more potentially related faults to the interpreter, the interpreter confirming or denying, in a response, that a connection relationship between the potentially related faults is valid.

46. The computer readable medium of claim 45, the instructions further causing the processor to perform:
recording the response from the interpreter and, if the connection relationship is confirmed by the interpreter, computing all connection relationship properties; and
adding intersection curve and other connection properties, representing new interpretations, to the fault which embeds the connection properties in with a set of interpretation data.

47. The computer readable medium of claim 46, the instructions further causing the processor to perform:
computing and displaying the final model to illustrate the faults as being connected or intersected.

48. The computer readable medium of claim 44, the instructions further causing the processor to perform:
computing connection relationship properties between the interpreted fault and the one or more other faults including the fault-fault intersection curve and a truncation rule; and
presenting the intersection curve of the one or more potentially related faults to the interpreter, the interpreter confirming or denying, in a response, that a connection relationship between the potentially related faults is valid.

49. The computer readable medium of claim 48, the instructions further causing the processor to perform:
recording the response from the interpreter and, if the connection relationship is confirmed by the interpreter, computing remaining connection relationship properties; and
adding an intersection curve and other connection properties, representing new interpretations, to the fault which embeds the connection relationship in with a set of interpretation data.

50. The computer readable medium of claim 44, the instructions further causing the processor to perform comprising:
computing and displaying the final model to illustrate the faults as being connected or intersected.

51. The computer readable medium of claim 44, wherein the step of detecting a condition whereby data associated with a fault being interpreted indicates that the fault being interpreted is in close proximity to one or more other faults comprises:
in connection with said one or more faults in a framework not including the fault being interpreted, determining if a relationship should be ignored between said interpreted fault and each fault among said one or more faults;
on the condition that said relationship should not be ignored, access a best-fit plane fault model and its transform,
obtain the fault-fault connection distance,
for each new interpretation point 'P', transform 'P' to a best-fit plane coordinate space,
validate that 'P' projects onto a real part of said each fault,
project 'P' onto said each fault as point 'P prime',
determine whether 'P prime' is on real part of fault,
determine whether a 'P' to 'P prime' distance is less than D,
on the condition that 'P prime' is on real part of fault and the 'P' to 'P prime' distance is less than D, mark said each fault as being in close proximity to the fault being interpreted.

52. The computer readable medium of claim 44, wherein the step of computing said fault-fault intersection curve comprises:
accessing an interpreted fault model, Fa, and its transform,
accessing an intellisensed fault model, Fb, and its transform,
computing an (Fa–Fb) intersection curve throughout a common model in a volume of interest,
obtaining the fault-fault connection distance D,
computing a tip loop extrapolated D beyond the Fa data using a selected tip loop style, and
resetting an intersection curve to real valued inside the tip loop.

53. A program storage device readable by a machine tangibly embodying a set of instructions executable by the machine to perform method steps for sensing fault-fault relationships, said method steps comprising:
automatically sensing interrelationships among a plurality of faults, wherein the sensing step comprises:
computing models of each fault of the plurality of faults as if each fault were unrelated to any other fault of the plurality of faults;
keeping un-related models of said each fault up-to-date as new interpretation data is produced, and
detecting a condition wherein data associated with a fault of the plurality of faults being interpreted indicates that the fault being interpreted is in close proximity to one or more other faults of the plurality of faults, said fault being in close proximity to said one or more faults on the condition that a 'P' to 'P prime' distance is less than D, wherein 'P' is an interpretation point, 'P prime' is the interpretation point projected onto each of said one or more other faults, and D is a fault-fault connection distance, and
computing a fault-fault intersection curve, and
presenting a final model including the fault-fault intersection curve and one fault truncated at the curve to an interpreter representing the interrelationships among the plurality of faults.

54. The program storage device of claim 53, further comprising:
presenting, in a pop-up window, the one or more potentially related faults to the interpreter, the interpreter confirming or denying, in a response, that a connection relationship between the potentially related faults is valid.

55. The program storage device of claim 54, further comprising:
recording the response from the interpreter and, if the connection relationship is confirmed by the interpreter, computing all connection relationship properties; and
adding intersection curve and other connection properties, representing new interpretations, to the fault which embeds the connection properties in with a set of interpretation data.

56. The program storage device of claim 55, further comprising:
computing and displaying the final model to illustrate the faults as being connected or intersected.

57. The program storage device of claim 53, further comprising:
computing connection relationship properties between the interpreted fault and the one or more other faults including the fault-fault intersection curve and a truncation rule; and
presenting the intersection curve of the one or more potentially related faults to the interpreter, the interpreter confirming or denying, in a response, that a connection relationship between the potentially related faults is valid.

58. The program storage device of claim 57, further comprising:
recording the response from the interpreter and, if the connection relationship is confirmed by the interpreter, computing remaining connection relationship properties; and
adding an intersection curve and other connection properties, representing new interpretations, to the fault which embeds the connection relationship in with a set of interpretation data.

59. The program storage device of claim 58, further comprising:
computing and displaying the final model to illustrate the faults as being connected or intersected.

60. The program storage device of claim 53, wherein the step of detecting a condition whereby data associated with a fault being interpreted indicates that the fault being interpreted is in close proximity to one or more other faults comprises:
in connection with said one or more faults in a framework not including the fault being interpreted, determining whether a relationship should be ignored between said interpreted fault and each fault among said one or more faults;

on the condition that said relationship should not be ignored, access a best-fit plane fault model and its transform, obtain the fault-fault connection distance, for each new interpretation point 'P', transform 'P' to a best-fit plane coordinate space, project 'P' onto said each fault as point 'P prime', determine whether 'P prime' is on real part of fault, determine whether a 'P' to 'P prime' distance is less than D, on the condition that 'P prime' is on real part of fault and the 'P' to 'P prime' distance is less than D, mark said each fault as being in close proximity to the fault being interpreted.

61. The program storage device of claim 53, wherein the step of computing said fault-fault intersection curve comprises:

accessing an interpreted fault model, Fa, and its transform, accessing an intellisensed fault model, Fb, and its transform, computing an (Fa–Fb) intersection curve throughout a common model in a volume of interest, obtaining the fault-fault connection distance D, computing a tip loop extrapolated D beyond the Fa data using a selected tip loop style, and resetting an intersection curve to real valued inside the tip loop.

62. A system adapted for sensing fault-fault relationships, comprising:

a memory; and a processor operatively connected to the memory and having functionality to execute instructions for:

automatically sensing interrelationships among a plurality of faults, wherein the sensing step comprises:

computing models of each fault of the plurality of faults as if each fault were unrelated to any other fault of the plurality of faults;

keeping un-related models of said each fault up-to-date as new interpretation data is produced, and detecting a condition wherein data associated with a fault of the plurality of faults being interpreted indicates that the fault being interpreted is in close proximity to one or more other faults of the plurality of faults, said fault being in close proximity to said one or more faults on the condition that a 'P' to 'P prime' distance is less than D, wherein 'P' is an interpretation point, 'P prime' is the interpretation point projected onto each of said one or more other faults, and D is a fault-fault connection distance, and computing a fault-fault intersection curve, and presenting a final model including the fault-fault intersection curve and one fault truncated at the curve to an interpreter representing the interrelationships among faults.

* * * * *